United States Patent
Gabai et al.

(10) Patent No.: US 8,719,092 B2
(45) Date of Patent: May 6, 2014

(54) METHOD AND SYSTEM FOR DIRECTING INFORMATION TO A PLURALITY OF USERS

(75) Inventors: Oz Gabai, Tel Aviv (IL); Nimrod Sandlerman, Ramat Gan (IL)

(73) Assignee: Bio-Ride Ltd., Tel Aviv (IL)

( * ) Notice: Subject to any disclaimer, the term of this patent is extended or adjusted under 35 U.S.C. 154(b) by 956 days.

(21) Appl. No.: 12/308,924

(22) PCT Filed: Jun. 24, 2007

(86) PCT No.: PCT/IL2007/000762
§ 371 (c)(1),
(2), (4) Date: Dec. 3, 2009

(87) PCT Pub. No.: WO2007/148342
PCT Pub. Date: Dec. 27, 2007

(65) Prior Publication Data
US 2010/0094706 A1    Apr. 15, 2010

Related U.S. Application Data

(60) Provisional application No. 60/889,307, filed on Feb. 12, 2007, provisional application No. 60/805,737, filed on Jun. 24, 2006.

(51) Int. Cl.
*G06Q 30/00* (2012.01)
*G06F 13/00* (2006.01)

(52) U.S. Cl.
USPC ............... 705/14.49; 705/14.53; 705/14.66; 705/14.69; 705/14.54; 705/14.73; 709/205

(58) Field of Classification Search
USPC ............ 705/14.73, 14.66, 14.69, 14.53, 14.1, 705/14.54; 707/802, E17.044
See application file for complete search history.

(56) References Cited

U.S. PATENT DOCUMENTS

| | | |
|---|---|---|
| 5,790,426 A | 8/1998 | Robinson |
| 5,918,014 A | 6/1999 | Robinson |
| 6,041,311 A | 3/2000 | Chislenko et al. |
| 6,064,980 A | 5/2000 | Jacobi et al. |
| 6,112,186 A | 8/2000 | Bergh et al. |
| 6,144,991 A | 11/2000 | England |
| 6,339,842 B1 * | 1/2002 | Fernandez et al. ............ 725/133 |
| 6,356,879 B2 | 3/2002 | Aggarwal et al. |
| 6,606,644 B1 | 8/2003 | Ford et al. |
| 6,845,229 B2 | 1/2005 | Notomi |
| 6,901,379 B1 | 5/2005 | Balter et al. |
| 6,976,220 B1 | 12/2005 | Lapstun et al. |

(Continued)

OTHER PUBLICATIONS

IEEE definition of server.*

(Continued)

*Primary Examiner* — Khanh H Le
(74) *Attorney, Agent, or Firm* — Abelman, Frayne & Schwab

(57) ABSTRACT

A method for directing information to a plurality of users, the method including enabling a plurality of users to access a shared web resource having multiple functional capabilities, automatically monitoring interactions of the plurality of users with the shared web resource, automatically analyzing results of the monitoring to ascertain at least one shared characteristic of the plurality of users and employing results of the analyzing to selectively direct non-user originated information to the plurality of users while the plurality of users is accessing the shared web resource.

27 Claims, 32 Drawing Sheets

(56) References Cited

U.S. PATENT DOCUMENTS

| | | |
|---|---|---|
| 7,149,665 B2 | 12/2006 | Feld et al. |
| 7,219,072 B1 | 5/2007 | Sundaresan |
| 7,647,247 B2 | 1/2010 | Abraham et al. |
| 7,941,755 B2 | 5/2011 | Siegrist et al. |
| 8,234,218 B2 | 7/2012 | Robinson et al. |
| 8,261,198 B2 | 9/2012 | Burckart et al. |
| 8,296,196 B2 | 10/2012 | Martine et al. |
| 8,316,450 B2 | 11/2012 | Robinson et al. |
| 2003/0149975 A1 | 8/2003 | Eldering et al. |
| 2005/0033656 A1 | 2/2005 | Wang et al. |
| 2005/0043060 A1 | 2/2005 | Brandenberg et al. |
| 2005/0096997 A1 | 5/2005 | Jain et al. |
| 2005/0108033 A1 | 5/2005 | Everett-Church |
| 2006/0015390 A1 | 1/2006 | Rijsinghani et al. |
| 2006/0122895 A1 | 6/2006 | Abraham et al. |
| 2006/0173702 A1 | 8/2006 | Saxena et al. |
| 2007/0150368 A1 | 6/2007 | Arora et al. |
| 2007/0220540 A1 | 9/2007 | Walker et al. |
| 2007/0276721 A1 | 11/2007 | Jackson |
| 2008/0243531 A1 | 10/2008 | Hyder et al. |
| 2009/0106085 A1 | 4/2009 | Raimbeault |
| 2009/0106113 A1 | 4/2009 | Arora et al. |
| 2009/0165140 A1 | 6/2009 | Robinson et al. |
| 2009/0287728 A1 | 11/2009 | Martine et al. |
| 2010/0257451 A1 | 10/2010 | Halevi et al. |
| 2012/0005598 A1 | 1/2012 | Burckart et al. |
| 2012/0047449 A1 | 2/2012 | Burckart et al. |
| 2012/0089659 A1 | 4/2012 | Halevi et al. |

OTHER PUBLICATIONS

Shelly, et al., "Supporting sociability in a shared browser", http://research.microsoft.com/scg/papers/sharedbrowsinginteract.pdf.

An Office Action dated Jun. 13, 2013, which issued during the prosecution of U.S. Appl. No. 12/746,986.

* cited by examiner

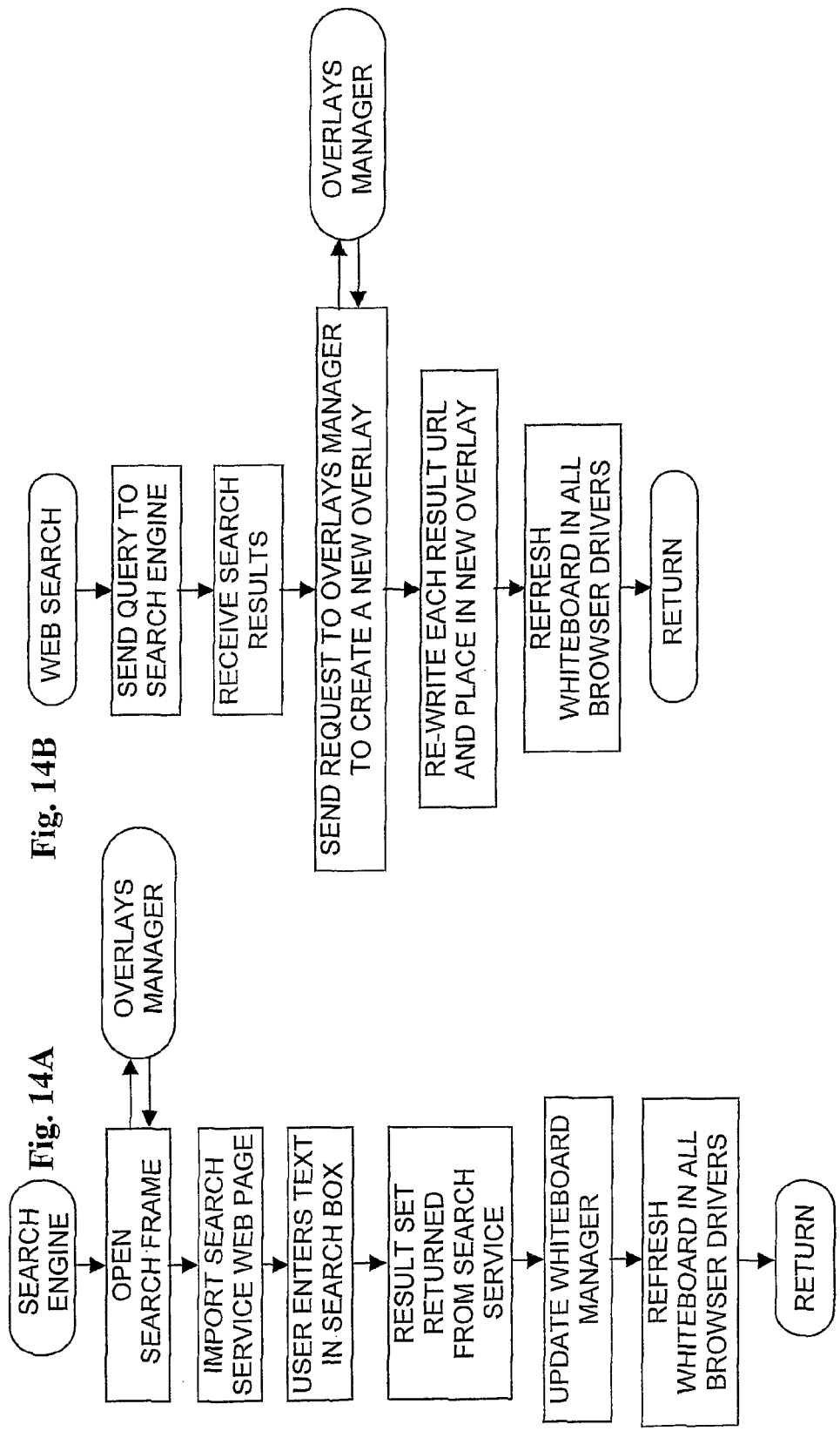

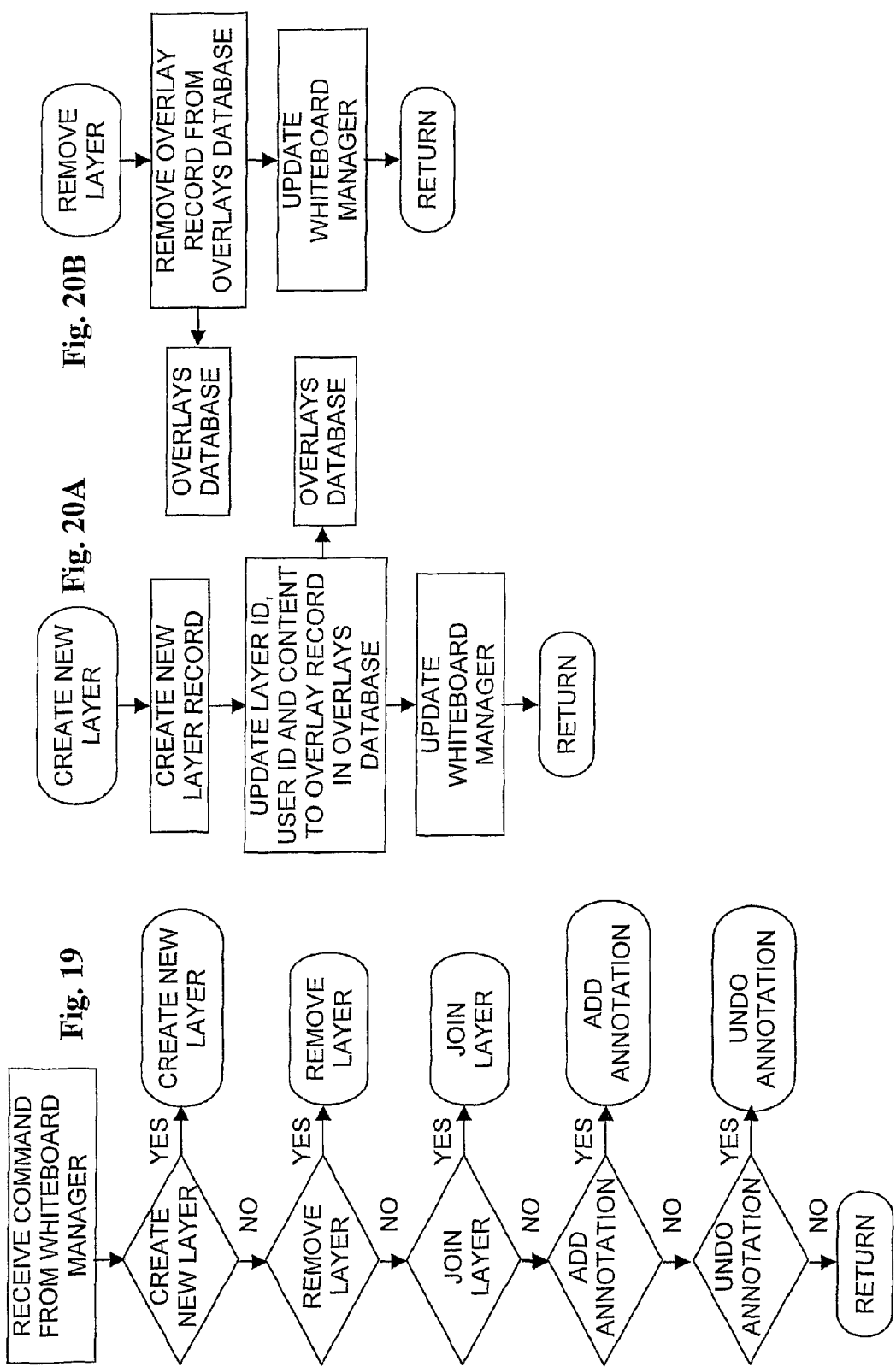

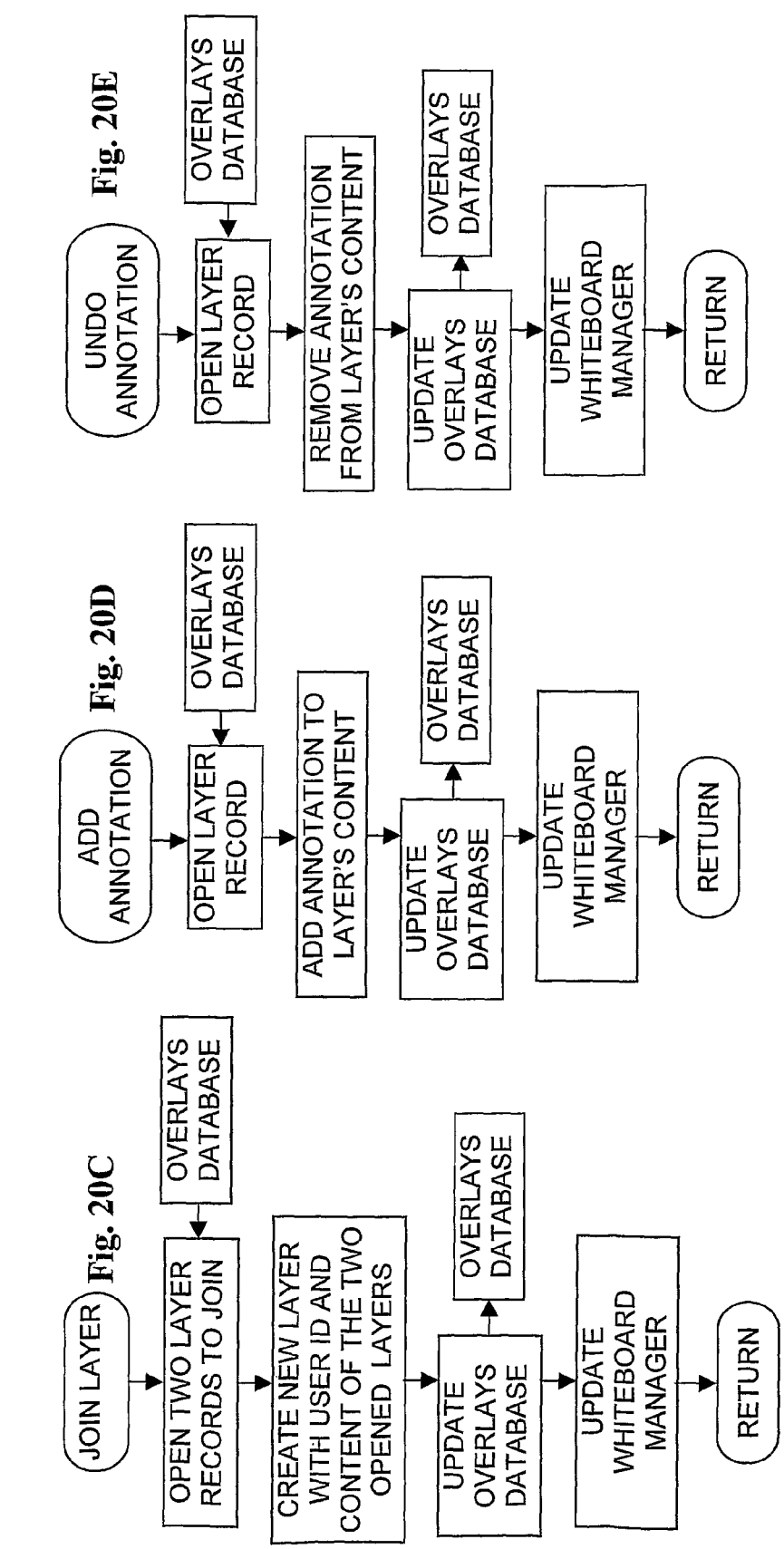

| | Entity Count | Info Keyword 2 | Info Keyword 3 | Info Keyword 4 | Info Keyword 5 | Info Keyword 6 | Info Keyword 7 | Info Keyword 9 | Info Keyword 9 | Info Keyword 10 | Info Keyword 11 | Info Keyword 12 |
|---|---|---|---|---|---|---|---|---|---|---|---|---|
| THRESHOLD | | 10 | 10 | 10 | 10 | 5 | 10 | 15 | 5 | 10 | 10 | 15 |
| CUMULATIVE COUNT | | 7 | 10 | 1 | 5 | 7 | 11 | 7 | 8 | 5 | 6 | 4 |
| SUBJECT 3 | 0 | | | | | | X | X | | | X | |
| SUBJECT 2 | 1 | X | | | | X | X | | | X | | X |
| SUBJECT 1 | 5 | | X | | | X | | X | X | | X | |
| KEYWORD 4 | 0 | X | | X | | X | | | X | | | |
| KEYWORD 3 | 1 | | X | | X | | X | | X | | | |
| KEYWORD 2 | 3 | | | | X | | X | | | | | X |
| KEYWORD 1 | 0 | | X | X | X | | | | | | | |
| TOOLBOX KEY 4 | 2 | X | | | | | X | X | X | | | |
| TOOLBOX KEY 3 | 4 | X | X | | | | | | X | | | |
| TOOLBOX KEY 2 | 1 | | | X | X | X | | | | X | | |
| TOOLBOX KEY 1 | 0 | | | X | X | X | | | | | | X |

Fig. 22

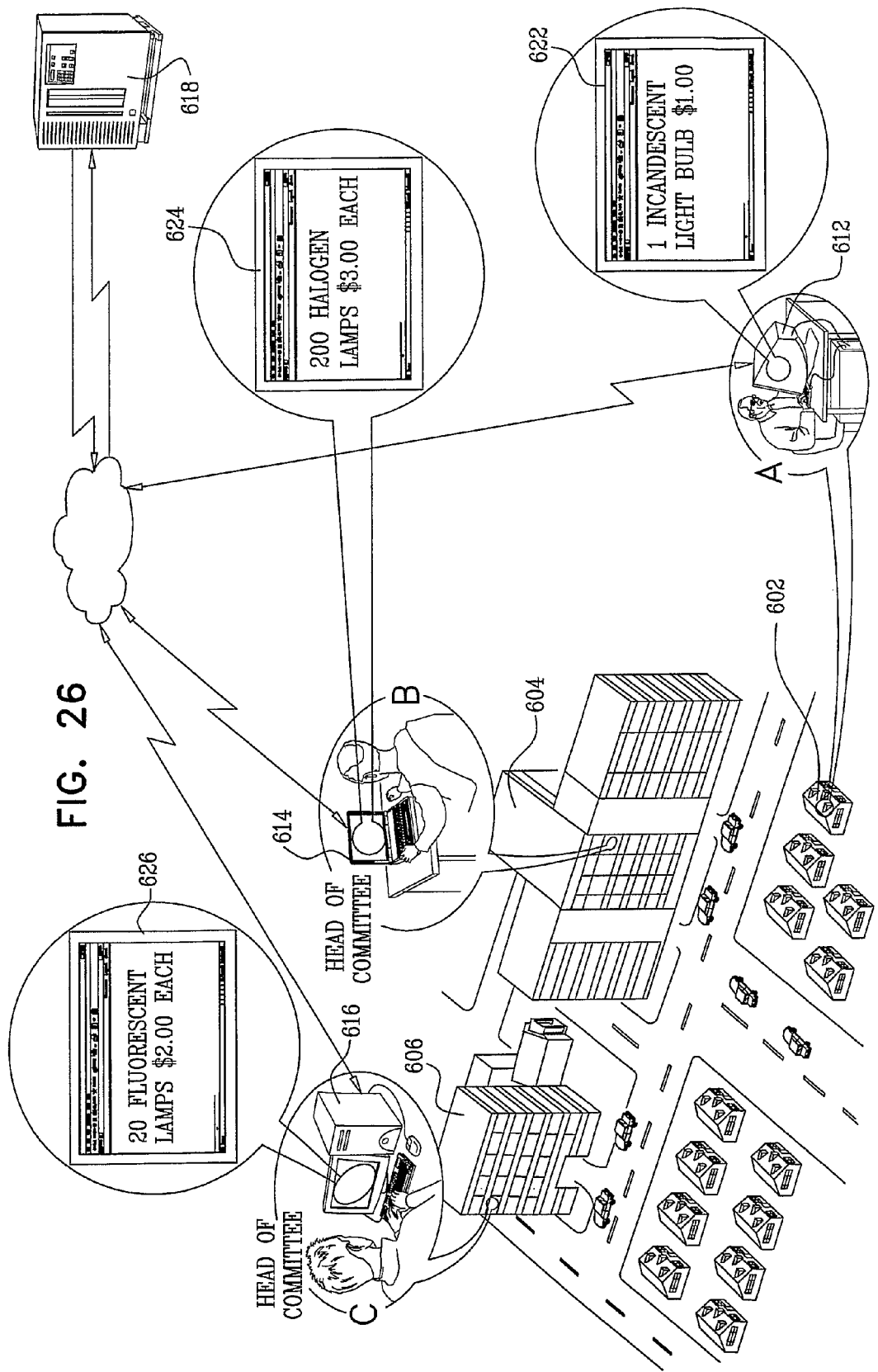

METHOD AND SYSTEM FOR DIRECTING INFORMATION TO A PLURALITY OF USERS

REFERENCE TO RELATED APPLICATIONS

Reference is made to U.S. Provisional Patent Application Ser. No. 60/805,737, filed Jun. 24, 2006 and entitled ONLINE INSTRUCTION SYSTEM and to U.S. Provisional Patent Application Ser. No. 60/889,307, filed Feb. 12, 2007 and entitled APARTMENT HOUSE FORUM, the disclosures of which are hereby incorporated by reference and priority of which is hereby claimed pursuant to 37 CFR 1.78(a) (4) and (5)(i).

FIELD OF THE INVENTION

The present invention relates generally to systems and functionalities for selectably directing information to users of Internet resources.

BACKGROUND OF THE INVENTION

The following patent publications are believed to represent the current state of the art:
U.S. Pat. Nos. 6,976,220; 6,845,229; 6,606,644; 6,339,842 and 6,144,991.

SUMMARY OF THE INVENTION

The present invention seeks to provide an improved system and methodology for selectably directing information to users of Internet resources.

There is thus provided in accordance with a preferred embodiment of the present invention a method for directing information to a plurality of users, the method including enabling a plurality of users to access a shared web resource having multiple functional capabilities, automatically monitoring interactions of the plurality of users with the shared web resource, automatically analyzing results of the monitoring to ascertain at least one shared characteristic of the plurality of users and employing results of the analyzing to selectively direct non-user originated information to the plurality of users while the plurality of users is accessing the shared web resource.

In accordance with a preferred embodiment of the present invention the automatically analyzing includes ascertaining at least one of a number of users currently using the shared web resource and a skill level of at least one of the plurality of users currently using the shared web resource. Preferably, the non-user originated information is automatically selected in accordance with the at least one shared characteristic of the plurality of users.

In accordance with another preferred embodiment of the present invention the non-user originated information is an advertisement. Additionally or alternatively, the non-user originated information is an offer to sell. Preferably, the method also includes carrying out a sale transaction with the plurality of users based on the non-user originated information.

There is also provided in accordance with another preferred embodiment of the present invention a method for directing information to a plurality of users, the method including enabling a plurality of users to access a shared web resource having multiple functional capabilities and enabling the plurality of users to incorporate an external web resource into the shared web resource, such that the external web resource is accessible to the plurality of users via the shared web resource.

In accordance with a preferred embodiment of the present invention the shared web resource is a whiteboard and the external web resource is a search functionality. Preferably, the method also includes enabling the plurality of users to annotate information received from the external web resource within a framework of the shared web resource. Additionally or alternatively, the method also includes enabling the plurality of users to operate the external web resource within a framework of the shared web resource.

In accordance with another preferred embodiment of the present invention the method also includes preserving a functionality of the external web resource within a framework of the shared web resource. Preferably, the external web resource includes a web page.

In accordance with yet another preferred embodiment of the present invention the method also includes automatically monitoring interactions of the plurality of users with the shared web resource and automatically analyzing results of the monitoring to ascertain at least one shared characteristic of the plurality of users. Preferably, operation of the external web resource is automatically adapted to the at least one shared characteristic of the plurality of users. Additionally or alternatively, operation of the external web resource includes retrieving information from the external web resource which information is automatically adapted to the at least one shared characteristic of the plurality of users.

In accordance with still another preferred embodiment of the present invention the operation includes searching for information. Preferably, the method also includes employing results of the analyzing to selectively direct non-user originated information to the plurality of users while the plurality of users is accessing the shared web resource. Additionally or alternatively, the method also includes carrying out a sale transaction with the plurality of users based on the non-user originated information.

In accordance with a further preferred embodiment of the present invention the shared web resource includes at least one server. Preferably, the at least one server includes one or more, or all of the following a browser manager module, a whiteboard manager module, a whiteboard overlays manager module, a whiteboard activity monitoring module, a whiteboard activity analyzer module, a whiteboard information directing manager module, a sourcing manager module, a subject matter database, a whiteboard database, an information repository, an overlays database, a users database and a sourcing database.

In accordance with a yet further preferred embodiment of the present invention the subject matter database is accessible by the whiteboard activity analyzer module. Preferably, the whiteboard database is accessible by at least one of the whiteboard manager module and the browser manager module. Additionally or alternatively, the information repository is accessible by the whiteboard information directing manager module.

In accordance with a still further preferred embodiment of the present invention the overlays database is accessible by the whiteboard overlays manager module. Preferably, the users database is accessible by at least one of the whiteboard activity monitoring module, the whiteboard activity analyzer module and the whiteboard manager module. Additionally or alternatively, the sourcing database is accessible by the sourcing manager module.

In accordance with an additional preferred embodiment of the present invention the at least one server is operative to perform one or more, or all, of browser driver tasks, a whiteboard manager task, a whiteboard overlays manager task, a whiteboard activity monitoring task, a whiteboard activity analyzer task, a whiteboard information directing manager task and a sourcing manager task. Preferably, browser driver tasks are equal in number to a number of the plurality of users. Additionally or alternatively, the whiteboard manager task communicates with the browser driver tasks.

In accordance with another preferred embodiment of the present invention the whiteboard overlays manager task communicates with the whiteboard manager task. Preferably, the whiteboard activity monitoring task communicates with the whiteboard manager task. Additionally or alternatively, the whiteboard activity analyzer task communicates with the whiteboard activity monitoring task.

In accordance with yet another preferred embodiment of the present invention the whiteboard information directing manager task communicates with the whiteboard activity analyzer task and with the whiteboard manager task. Preferably, the sourcing manager task communicates with the browser driver tasks and with the sourcing database. Additionally or alternatively, the sourcing manager task communicates with external databases operated by external services offering products for sale.

In accordance with still another preferred embodiment of the present invention the users database stores personalizing information regarding each of the plurality of users and provides the personalizing information to the whiteboard activity analyzer task. Preferably, the subject matter database stores information relating to external topics and supplies the information relating to external topics to the whiteboard activity analyzer task. Additionally or alternatively, the information repository stores information to be pushed to the plurality of users, and supplies the information to be pushed to the plurality of users to the whiteboard information directing manager task.

In accordance with a further preferred embodiment of the present invention the subject matter database and the information repository are located within the at least one server. Preferably, the subject matter database and the information repository are remotely located from the at least one server and are shared and accessible via the Internet. Additionally or alternatively, the subject matter database includes at least one of a search engine and an information directory.

In accordance with a yet further preferred embodiment of the present invention the information repository includes a web advertising management engine. Preferably, the browser manager module includes a user access subroutine including user login functionality and user registration functionality. Additionally or alternatively, the sourcing manager module is operative to perform automatic online bidding.

In accordance with a still further preferred embodiment of the present invention the sourcing manager module is also operative to facilitate a purchase. Preferably, the at least one server is operative to sense a level of the plurality of users employing the shared web resource. Additionally or alternatively, the at least one server is operative to sense the level by analyzing stored profiles of the plurality of the users.

There is further provided in accordance with a further preferred embodiment of the present invention a method for directing information to a user, the method including establishing a database containing data about individuals belonging to at least one group of individuals associated with at least one urban structure and directing information to at least one of the individuals, the information being automatically selected based on at least one of common characteristics of a group of individuals associated with one of the at least one urban structure, to which group the at least one of the individuals belongs and characteristics of the at least one urban structure with which the at least one of the individuals is associated.

In accordance with a preferred embodiment of the present invention the information is an advertisement. Preferably, the information is an offer to sell. Additionally or alternatively, the establishing a database includes monitoring financial transactions related to the at least one urban structure in order to ascertain financial status of the individuals.

There is additionally provided in accordance with an additional preferred embodiment of the present invention a system for directing information to a plurality of users, the system including a shared web resource having multiple functional capabilities accessible to a plurality of users, an interactions monitor operative to automatically monitor interactions of the plurality of users with the shared web resource, an analyzer operative to automatically analyze the interactions and to ascertain at least one shared characteristic of the plurality of users and an information director operative to selectively direct non-user originated information to the plurality of users while the plurality of users is accessing the shared web resource based on the at least one shared characteristic.

In accordance with a preferred embodiment of the present invention the analyzer is operative to ascertain at least one of a number of users currently using the shared web resource and a skill level of at least one of the plurality of users currently using the shared web resource. Preferably, the non-user originated information is automatically selected in accordance with the shared characteristics of the plurality of users.

In accordance with another preferred embodiment of the present invention the non-user originated information is an advertisement. Preferably, the non-user originated information is an offer to sell. Additionally or alternatively, the system also includes a sale transaction processor operative to carry out a sale transaction with the plurality of users based on the non-user originated information.

There is also provided in accordance with another preferred embodiment of the present invention a system for directing information to a plurality of users, the system including a shared web resource having multiple functional capabilities accessible to a plurality of users and a resource incorporator operative to enable the plurality of users to incorporate an external web resource into the shared web resource, such that the external web resource is accessible to the plurality of users via the shared web resource.

In accordance with a preferred embodiment of the present invention the shared web resource is a whiteboard and the external web resource is a search functionality. Preferably, the plurality of users are enabled to annotate information received from the external web resource within a framework of the shared web resource. Additionally or alternatively, the plurality of users are enabled to operate the external web resource within a framework of the shared web resource.

In accordance with another preferred embodiment of the present invention the system also includes a functionality preserver operative to preserve a functionality of the external web resource within a framework of the shared web resource. Preferably, the external web resource includes a web page.

In accordance with still another preferred embodiment of the present invention the system also includes an interactions monitor operative to automatically monitor interactions of the plurality of users with the shared web resource and an analyzer operative to automatically analyze the interactions and to ascertain at least one shared characteristic of the plurality of users. Preferably, operation of the external web resource is automatically adapted to the at least one shared characteristic of the plurality of users. Additionally or alternatively, operation of the external web resource includes retrieving information from the external web resource which information is automatically adapted to the at least one shared characteristic of the plurality of users.

In accordance with yet another preferred embodiment of the present invention the operation includes searching for information. Preferably, the system also includes an information director operative to selectively direct non-user originated information to the plurality of users while the plurality of users is accessing the shared web resource based on the at least one shared characteristic. Additionally or alternatively, the system also includes a sale transaction processor operative to carry out a sale transaction with the plurality of users based on the non-user originated information.

In accordance with a further preferred embodiment of the present invention the shared web resource includes at least one server. Preferably, the at least one server includes one or more, or all, of a browser manager module, a whiteboard manager module, a whiteboard overlays manager module, a whiteboard activity monitoring module, a whiteboard activity analyzer module, a whiteboard information directing manager module, a sourcing manager module, a subject matter database, a whiteboard database, an information repository, an overlays database, a users database and a sourcing database.

In accordance with a still further preferred embodiment of the present invention the subject matter database is accessible by the whiteboard activity analyzer module. Preferably, the whiteboard database is accessible by at least one of the whiteboard manager module and the browser manager module. Additionally or alternatively, the information repository is accessible by the whiteboard information directing manager module.

In accordance with a yet further preferred embodiment of the present invention the overlays database is accessible by the whiteboard overlays manager module. Preferably, the users database is accessible by at least one of the whiteboard activity monitoring module, the whiteboard activity analyzer module and the whiteboard manager module. Additionally or alternatively, the sourcing database is accessible by the sourcing manager module.

In accordance with an additional preferred embodiment of the present invention the at least one server is operative to perform one or more, or all, of browser driver tasks, a whiteboard manager task, a whiteboard overlays manager task, a whiteboard activity monitoring task, a whiteboard activity analyzer task, a whiteboard information directing manager task and a sourcing manager task. Preferably, the browser driver tasks are equal in number to a number of the plurality of users. Additionally or alternatively, the whiteboard manager task communicates with the browser driver tasks.

In accordance with another preferred embodiment of the present invention the whiteboard overlays manager task communicates with the whiteboard manager task. Preferably, the whiteboard activity monitoring task communicates with the whiteboard manager task. Additionally or alternatively, the whiteboard activity analyzer task communicates with the whiteboard activity monitoring task.

In accordance with yet another preferred embodiment of the present invention the whiteboard information directing manager task communicates with the whiteboard activity analyzer task and with the whiteboard manager task. Preferably, the sourcing manager task communicates with the browser driver tasks and with the sourcing database. Additionally or alternatively, the sourcing manager task communicates with external databases operated by external services offering products for sale.

In accordance with still another preferred embodiment of the present invention the users database stores personalizing information regarding each of the plurality of users and provides the personalizing information to the whiteboard activity analyzer task. Preferably, the subject matter database stores information relating to external topics and supplies the information relating to external topics to the whiteboard activity analyzer task. Additionally or alternatively, the information repository stores information to be pushed to the plurality of users, and supplies the information to be pushed to the plurality of users to the whiteboard information directing manager task.

In accordance with a further preferred embodiment of the present invention the subject matter database and the information repository are located within the at least one server. Alternatively, the subject matter database and the information repository are remotely located from the at least one server and are shared and accessible via the Internet. Preferably, the subject matter database includes at least one of a search engine and an information directory.

In accordance with a still further preferred embodiment of the present invention the information repository includes a web advertising management engine. Preferably, the browser manager module includes a user access subroutine including user login functionality and user registration functionality. Additionally or alternatively, the sourcing manager module is operative to perform automatic online bidding.

In accordance with an additional preferred embodiment of the present invention the sourcing manager module is operative to facilitate a purchase. Preferably, the at least one server is operative to sense a level of the plurality of users employing the shared web resource. Additionally or alternatively, the at least one server is operative to sense the level by analyzing stored profiles of the plurality of the users.

There is further provided in accordance with a further preferred embodiment of the present invention a system for directing information to a user, the system including a database containing data about individuals belonging to at least one group of individuals associated with at least one urban structure and an information director operative to direct information to at least one of the individuals, the information being automatically selected based on at least one of common characteristics of a group of individuals associated with one of the at least one urban structure, to which group the at least one of the individuals belongs and characteristics of the at least one urban structure with which the at least one of the individuals is associated.

In accordance with a preferred embodiment of the present invention the information is an advertisement. Preferably, the information is an offer to sell. Additionally or alternatively, the establishing a database includes monitoring financial transactions related to the at least one urban structure in order to ascertain financial status of the individuals.

There is additionally provided in accordance with an additional preferred embodiment of the present invention a computer program for directing information to a plurality of users, the computer program including computer readable program code for enabling a plurality of users to access a shared web resource having multiple functional capabilities, computer readable program code for automatically monitoring interactions of the plurality of users with the shared web resource, computer readable program code for automatically analyzing results of the monitoring to ascertain at least one shared characteristic of the plurality of users and computer readable program code for employing results of the analyzing to selectively direct non-user originated information to the plurality of users while the plurality of users is accessing the shared web resource.

In accordance with a preferred embodiment of the present invention the computer readable program code for automatically analyzing results is operative to ascertain at least one of a number of users currently using the shared web resource and a skill level of at least one of the plurality of users currently using the shared web resource. Preferably, the non-user originated information is automatically selected in accordance with the at least one shared characteristic of the plurality of users.

In accordance with another preferred embodiment of the present invention the non-user originated information is an advertisement. Additionally or alternatively, the non-user originated information is an offer to sell. Preferably, the program also includes computer readable program code for carrying out a sale transaction with the plurality of users based on the non-user originated information.

There is further provided in accordance with a further preferred embodiment of the present invention a computer program for directing information to a plurality of users, the computer program including computer readable program code for enabling a plurality of users to access a shared web resource having multiple functional capabilities and computer readable program code for enabling the plurality of users to incorporate an external web resource into the shared web resource, such that the external web resource is accessible to the plurality of users via the shared web resource.

In accordance with a preferred embodiment of the present invention the shared web resource is a whiteboard and the external web resource is a search functionality. Preferably, the plurality of users are enabled to annotate information received from the external web resource within a framework of the shared web resource. Additionally or alternatively, the plurality of users are enabled to operate the external web resource within a framework of the shared web resource.

In accordance with another preferred embodiment of the present invention the program also includes computer readable program code for preserving a functionality of the external web resource within a framework of the shared web resource. Preferably, the external web resource includes a web page.

In accordance with still another preferred embodiment of the present invention the computer program also includes computer readable program code for automatically monitoring interactions of the plurality of users with the shared web resource and computer readable program code for automatically analyzing results of the monitoring to ascertain at least one shared characteristic of the plurality of users. Preferably, operation of the external web resource is automatically adapted to the at least one shared characteristic of the plurality of users. Additionally or alternatively, operation of the external web resource includes retrieving information from the external web resource which information is automatically adapted to the at least one shared characteristic of the plurality of users.

In accordance with a further preferred embodiment of the present invention the operation includes searching for information. Preferably, the computer program also includes computer readable program code for employing results of the analyzing to selectively direct non-user originated information to the plurality of users while the plurality of users is accessing the shared web resource. Additionally or alternatively, the computer program also includes a computer readable program code for carrying out a sale transaction with the plurality of users based on the non-user originated information. Furthermore, the shared web resource includes at least one server.

There is also provided in accordance with another preferred embodiment of the present invention a computer program for directing information to a user, the computer program including computer readable program code for establishing a database containing data about individuals belonging to at least one group of individuals associated with at least one urban structure and computer readable program code for directing information to at least one of the individuals, the information being automatically selected based on at least one of common characteristics of a group of individuals associated with one of the at least one urban structure, to which group the at least one of the individuals belongs and characteristics of the at least one urban structure with which the at least one of the individuals is associated.

In accordance with a preferred embodiment of the present invention the information is an advertisement. Additionally or alternatively, the information is an offer to sell. Preferably, the computer readable program code for establishing a database is operative to monitor financial transactions related to the at least one urban structure in order to ascertain financial status of the individuals.

BRIEF DESCRIPTION OF THE DRAWINGS

The present invention will be understood and appreciated more fully from the following detailed description, taken in conjunction with the drawings in which:

FIGS. 14A and 14B are each a simplified flow chart illustrating the operation of a different alternative of a web search subroutine useful in the operation of a whiteboard manager module as shown in FIG. 12;

FIG. 19 is a simplified flow chart illustrating the operation of an overlays manager module forming part of the browser-server structure of FIG. 6;

FIGS. 20A, 20B, 20C, 20D and 20E are simplified flow charts illustrating various subroutines in the flowchart of FIG. 18;

FIG. 22 is a simplified illustration of a typical matrix employed by the activity analyzer module of FIG. 6 in the operation illustrated in FIGS. 21A and 21B;

FIG. 26 is a simplified pictorial illustration of a sourcing system and sourcing functionality constructed and operative in accordance with a preferred embodiment of the present invention.

DETAILED DESCRIPTION OF PREFERRED EMBODIMENTS

Figure 1:
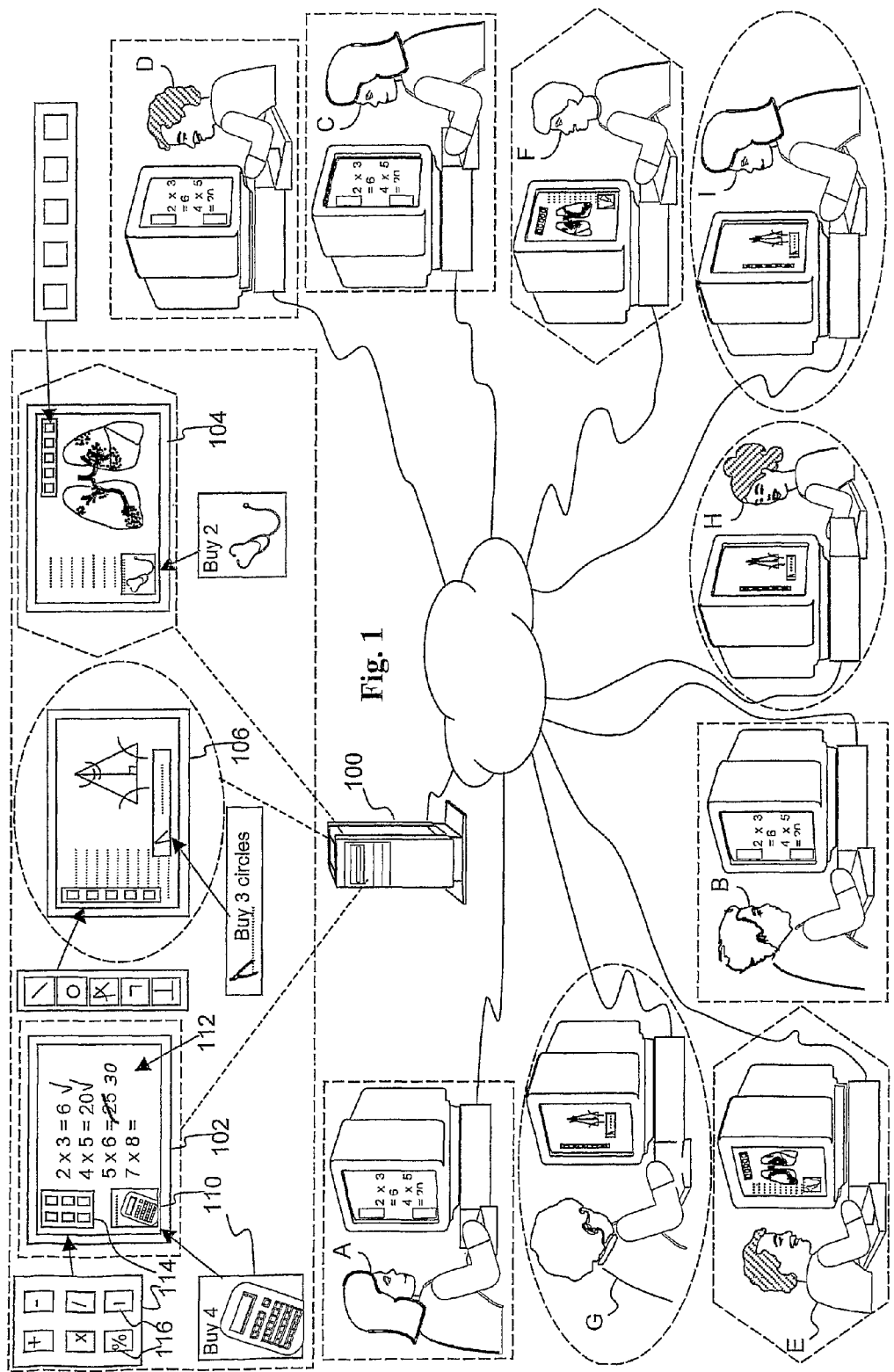
FIG. 1 is a simplified pictorial illustration of a system and methodology for selectably directing information to users of Internet resources in accordance with one embodiment of the present invention.

Reference is now made to FIG. 1, which is a simplified pictorial illustration of a system and methodology for selectably directing information to users of Internet resources in accordance with one embodiment of the present invention.

As seen in FIG. 1, multiple users, each connected to the Internet, are interacting via various whiteboards, which are dedicated to various subjects and resident on one or more servers 100. One whiteboard, here designated by reference number 102, deals with arithmetic, another whiteboard, here designated by reference numeral 104, deals with biology, and a third whiteboard, here designated by reference numeral 106, deals with geometry.

For the purposes of the specification and claims, the term "whiteboard" refers to any computerized interactive visual, audio, audio-visual or multi-media multi-user platform, which enables contributions of any participant to be received by other participants in effective real time.

Examples of whiteboards include visual whiteboards on which various students may work together to solve math problems, such as problems in arithmetic, geometry and calculus, audio-enabled whiteboards, in which players of instruments may combine their talents, and audio-visual whiteboards which enable students to discuss anatomy while viewing and annotating images.

It is seen that users designated by letters A, B, C and D are interacting with each other on whiteboard 102, while users designated by letters E and F are interacting with each other on whiteboard 104 and users designated by letters G, H and I are interacting with each other on whiteboard 106.

In accordance with a preferred embodiment of the present invention, the system of FIG. 1 is operative for directing information to a plurality of users, for example to the group of users A, B, C and D using the whiteboard 102, or to the group of users E and F using the whiteboard 104 or to the group of users G, H and I using the whiteboard 106 in accordance with the following methodology:

enabling the plurality of users to access a networked resource, such as any of whiteboards 102, 104 and 106, monitoring at a server, such as server 100, interactions between the plurality of users and the networked resource; and selectively pushing non-user originated information, which is selected based on the nature of the networked resource and the interactions, to the plurality of users while the plurality of users is accessing the networked resource.

In the present example of the arithmetic whiteboard 102, server 100 senses, by monitoring the interactions of participants A, B, C and D with the whiteboard 102, that participants A, B, C and D are interacting on a third grade level, and pushes to all participants non-user originated information in the form of an advertisement, indicated by reference numeral 110, for a calculator useful for third graders. It is a further feature of the present invention, that server 100 senses the number of participants, 4 in the present case, and adapts the advertisement 110 to the number of participants. Thus the advertisement 110 provides a special price if four such calculators are purchased within a given time, by participants A, B, C and D.

In accordance with a preferred embodiment of the present invention, server 100 senses the grade level of the participants by one or more indicators, such as a specific white board template 112 selected, such as a template for a given grade level, a specific tool box selected, such as a tool box 114 suitable for a given level of skill at the third grade level, and the use of specific keys 116 in the tool box 114 by the various participants.

Figure 2:
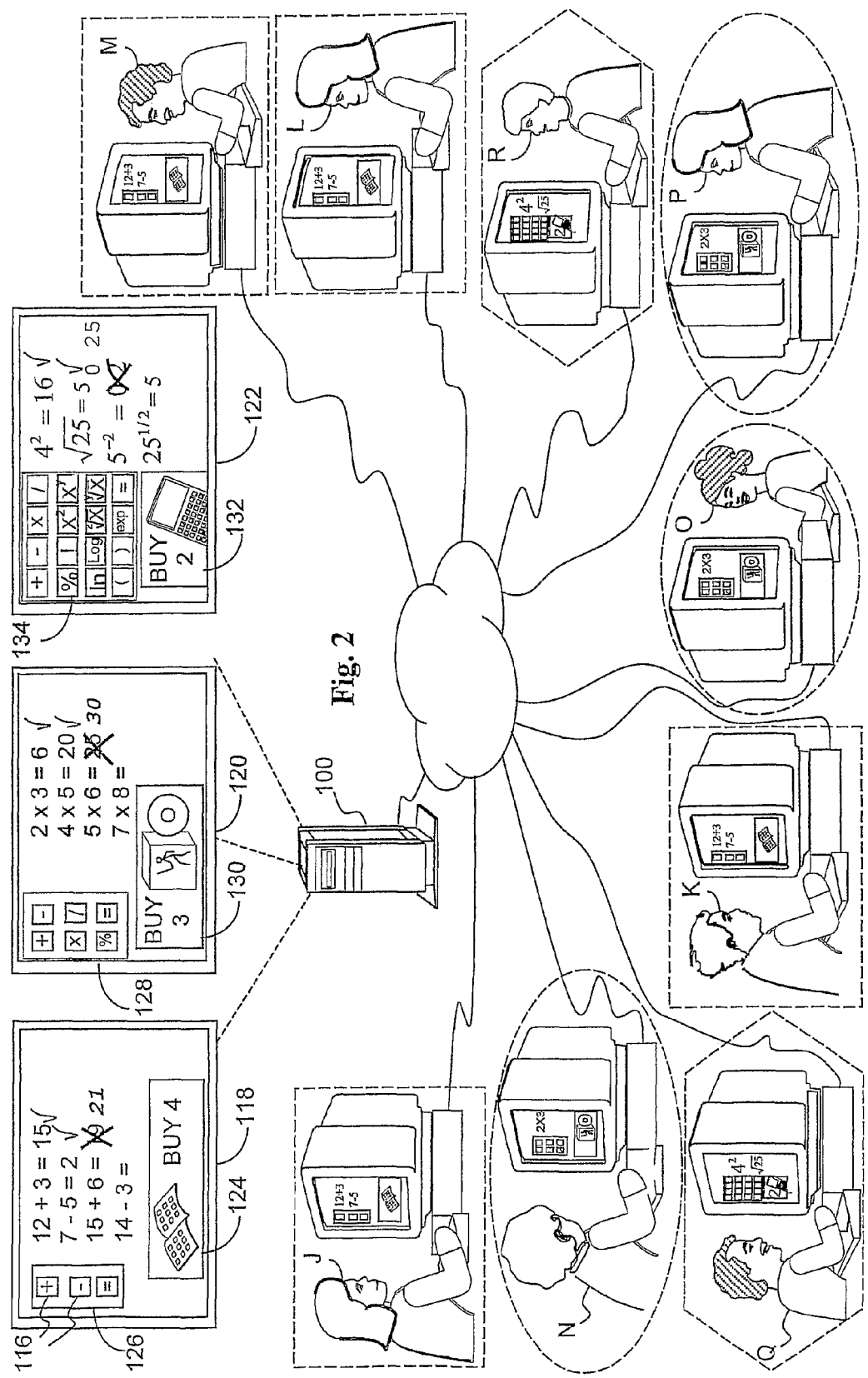
FIG. 2 is a simplified pictorial illustration of a system and methodology for selectably directing information to users of Internet resources in accordance with another embodiment of the present invention.

Reference is now made to FIG. 2, which is a simplified pictorial illustration of a system and methodology for selectably directing information to users of Internet resources in accordance with another embodiment of the present invention.

As seen in FIG. 2, multiple users, each connected to the Internet, are interacting via various whiteboards, which are resident on one or more servers 100. FIG. 2 shows three such whiteboards, all dedicated to the same subject, but on different levels of use, or learning, of that subject.

One whiteboard, here designated by reference number 118, is used by participants designated by J, K, L and M. Whiteboard 118 deals with arithmetic for the second grade, for example addition and subtraction.

Another whiteboard, here designated by reference numeral 120, is used by participants designated by N, O, and P. Whiteboard 120 deals with arithmetic for the third grade, for example multiplication and division.

A third whiteboard, here designated by reference numeral 122, is used by participants designated by Q and R. Whiteboard 122 deals with arithmetic for the sixth grade, for example calculating powers and roots.

In accordance with a preferred embodiment of the present invention, the system of FIG. 2 is operative for directing information to a plurality of users, for example to the group of users J, K, L and M using the whiteboard 118, or the group of users N, O, and P using the whiteboard 120 or the group of users Q and R using the whiteboard 122, in accordance with the following methodology:

enabling the plurality of users to access a networked resource, such as any of whiteboards 118, 120 and 122, monitoring at a server, such as server 100, interactions between the plurality of users and the networked resource; and selectively pushing non-user originated information, which is selected based on the nature of the networked resource and the interactions, to the plurality of users while the plurality of users is accessing the networked resource.

In accordance with a preferred embodiment of the present invention for the arithmetic whiteboard 118, server 100 senses, by monitoring the interactions of participants J, K, L and M with the whiteboard 118, that participants J, K, L and M are interacting on a second grade level.

In this case, the server 100 preferably senses that the participants J, K, L and M are dealing with addition and subtraction, which is on a second grade level. In the example of FIG. 2, the server 100 senses the level of using the arithmetic whiteboard 118 by identifying the type, or level, of the toolbox 126 used by the participants J, K, L and M. In the example shown in FIG. 2, the toolbox 126 contains keys 116 adequate only for second grade arithmetic, namely addition and subtraction.

Thus, in accordance with the subject and the level of use of whiteboard 118, namely second grade arithmetic, server 100 preferably pushes to all participants non-user originated information in the form of an advertisement, indicated by reference numeral 124, for an arithmetic leaflet useful for second graders.

It is a further feature of the present invention, that server 100 senses the number of participants, 4 in the present case, and adapts the advertisement 124 to the number of participants. Thus, the advertisement 124 provides a special price if four such leaflets are purchased within a given time, by participants J, K, L and M.

Similarly, in the present example of the arithmetic whiteboard 120, server 100 senses, preferably by monitoring the interactions of participants N, O and P with the whiteboard 120, that participants N, O and P are interacting on a third grade level.

In this case, the server 100 senses that the participants N, O and P are dealing with multiplication and division, which is on a third grade level. In the example of FIG. 2, the server 100 senses the level of using the arithmetic whiteboard 120 preferably by identifying the type, or level, of the toolbox 128 used by the participants N, O and P. In the example shown in FIG. 2, the toolbox 128 contains keys adequate for third grade arithmetic, namely addition, subtraction, multiplication and division.

Thus, in accordance with the subject and the level of use of whiteboard 120, namely third grade arithmetic, server 100 preferably pushes to all participants non-user originated information in the form of an advertisement, indicated by reference numeral 130, for a computer game for teaching third grade arithmetic.

Again, it is a further feature of the present invention, that server 100 senses the number of participants, 3 in the present case, and adapts the advertisement 130 to the number of participants. Thus, the advertisement 130 provides a special price if three such computer games are purchased within a given time, by participants N, O and P.

Similarly, in the present example of the arithmetic whiteboard 122, server 100 senses, preferably by monitoring the interactions of participants Q and R with the whiteboard 122, that participants Q and R are interacting on a sixth grade level, and pushes to all participants non-user originated information in the form of an advertisement, indicated by reference numeral 132, for a calculator useful for learning sixth grade arithmetic.

In this case, the server 100 senses that the participants Q and R are calculating powers and roots, which is on a sixth grade level. In the example of FIG. 2, the server 100 senses the level of using the arithmetic whiteboard 122 preferably by identifying the type, or level, of the toolbox 134 used by the participants Q and R. In the example shown in FIG. 2, the toolbox 134 preferably contains keys adequate for sixth grade arithmetic, namely addition, subtraction, multiplication and division, power, root, etc.

Again, it is a further feature of the present invention, that server 100 senses the number of participants, 2 in the present case, and adapts the advertisement 132 to the number of participants. Thus, the advertisement 132 provides a special price if two such calculators are purchased within a given time, by participants Q and R.

Figure 3:
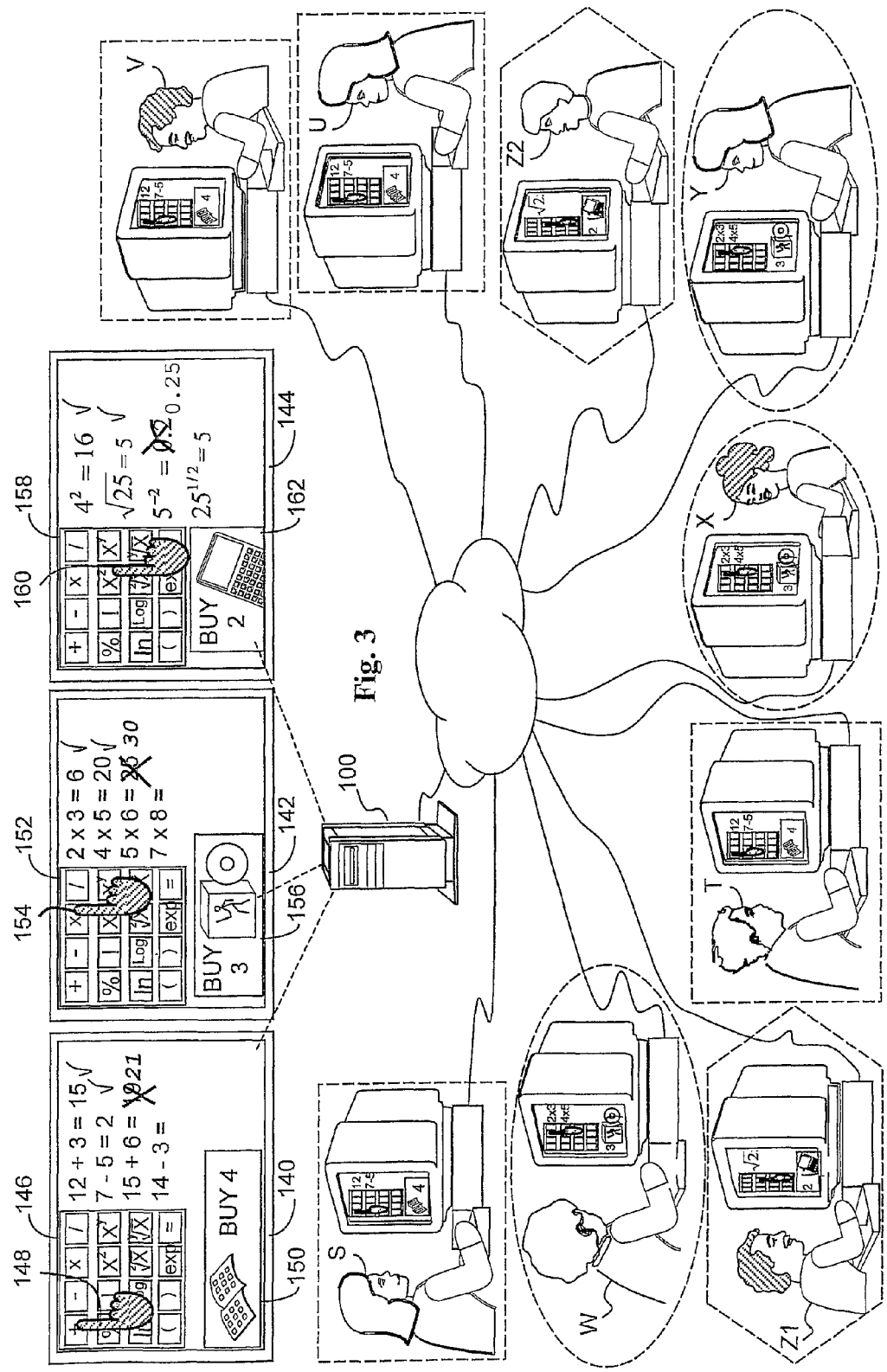
FIG. 3 is a simplified pictorial illustration of a system and methodology for selectably directing information to users of Internet resources in accordance with yet another embodiment of the present invention.

Reference is now made to FIG. 3, which is a simplified pictorial illustration of a system and methodology for selectably directing information to users of Internet resources in accordance with yet another embodiment of the present invention.

As seen in FIG. 3, multiple users, each connected to the Internet, are interacting via various whiteboards, which are resident on one or more servers 100. FIG. 3 shows three such whiteboards, all dedicated to the same subject, but in different levels of use, or learning, of that subject.

One whiteboard, here designated by reference number 140, is used by participants designated by S, T, U and V. Whiteboard 140 deals with arithmetic for the second grade, for example addition and subtraction.

Another whiteboard, here designated by reference numeral 142, is used by participants designated by W, X, and Y. Whiteboard 142 deals with arithmetic for the third grade, for example multiplication and division.

A third whiteboard, here designated by reference numeral 144, is used by participants designated by Z1 and Z2. Whiteboard 144 deals with arithmetic for the sixth grade, for example calculating powers and roots.

In accordance with a preferred embodiment of the present invention, the system of FIG. 3 is operative for directing information to a plurality of users, for example to the group of users S, T, U and V using the whiteboard 140, or the group of users W, X, and Y using the whiteboard 142 or the group of users Z1 and Z2 using the whiteboard 144, in accordance with the following methodology:

enabling the plurality of users to access a networked resource, such as any of whiteboards 140, 142 and 144, monitoring at a server, such as server 100, interactions between the plurality of users and the networked resource; and selectively pushing non-user originated information, which is selected based on the nature of the networked resource and the interactions, to the plurality of users while the plurality of users is accessing the networked resource.

In the present example of the arithmetic whiteboard 140, server 100 senses, preferably by monitoring the interactions of participants S, T, U and V with the whiteboard 140, that participants S, T, U and V are interacting on a second grade level.

In this case, the server 100 senses that the participants S, T, U and V are dealing with addition and subtraction, which is on a second grade level. In the example of FIG. 3, the server 100 senses the level at which the participants are using the arithmetic whiteboard 140 preferably by identifying the level at which the toolbox 146 is employed by the participants S, T, U and V. In the example shown in FIG. 3, the participants S, T, U and V use only the addition and subtraction keys of the toolbox 146, which are adequate for second grade arithmetic. For example, server 100 senses the level use of the keyboard 146 by tracking a cursor or pointer 148 or by identifying toolbox icons that are clicked on.

Thus, in accordance with the subject of the whiteboard 140 and the level of the participants' use of whiteboard 140, namely second grade arithmetic, server 100 preferably pushes to all participants non-user originated information in the form of an advertisement, indicated by reference numeral 150, for an arithmetic leaflet useful for second graders.

It is a further feature of the present invention, that server 100 senses the number of participants, 4 in the present case, and preferably adapts the advertisement 150 to the number of participants. Thus, the advertisement 150 provides a special price if four such leaflets are purchased within a given time, by participants S, T, U and V.

Similarly, in the present example of the arithmetic whiteboard 142, server 100 senses, by monitoring the interactions of participants W, X, and Y with the whiteboard 142, that participants W, X, and Y are interacting on a third grade level.

In this case, the server 100 senses that the participants W, X, and Y are dealing with multiplication and division, which is on a third grade level. In the example of FIG. 3, the server 100 senses the level at which the participants use the arithmetic whiteboard 142 by identifying the level at which the toolbox 152 is used by the participants W, X, and Y. It is noted that toolboxes 146 and 152 are similar and the level of use of the toolbox differentiates between the group of participants S, T, U and V and the group of participants W, X, and Y.

In the example shown in FIG. 3, the participants W, X and Y use the multiplication and division keys of the toolbox 152, which is suitable for third grade arithmetic. For example, server 100 senses the use of the toolbox 152 by tracking a cursor or pointer 154 or by identifying toolbox icons that are clicked on.

Thus, in accordance with subject of the whiteboard 142 and the level at which the participants use the whiteboard 142, namely third grade arithmetic, server 100 pushes to all participants non-user originated information in the form of an advertisement, indicated by reference numeral 156, for a computer game for teaching arithmetic to third graders.

It is a further feature of the present invention, that server 100 senses the number of participants, 3 in the present case, and adapts the advertisement 156 to the number of participants. Thus, the advertisement 156 provides a special price if three such computer games are purchased within a given time, by participants W, X and Y.

Similarly, in the present example of the arithmetic whiteboard 144, server 100 senses, by monitoring the interactions of participants Z1 and Z2 with the whiteboard 144, that participants Z1 and Z2 are interacting on a sixth grade level.

In this case, the server 100 senses that the participants Z1 and Z2 are dealing with calculating powers and roots, which is on a sixth grade level. In the example of FIG. 3, the server 100 senses the level of using the arithmetic whiteboard 144 by identifying the level of use of toolbox 158 by the participants Z1 and Z2. It is noted that toolboxes 146 and 152 and 158 are similar, and it is the level at which the participants use the toolbox that differentiates between the groups of participants.

In the example shown in FIG. 3, the participants Z1 and Z2 use the power and root keys of the toolbox 158, which is suitable for sixth grade arithmetic. For example, server 100 senses the use of the toolbox 158 by tracking a cursor or pointer 160 or by identifying toolbox icons that are clicked on.

Thus, in accordance with the subject of the whiteboard 144 and the level at which whiteboard 144 is used, namely sixth grade arithmetic, server 100 pushes to all participants non-user originated information in the form of an advertisement, indicated by reference numeral 162, for a calculator adequate for use by sixth graders.

It is a further feature of the present invention, that server 100 senses the number of participants, 2 in the present case, and adapts the advertisement 162 to the number of participants. Thus, the advertisement 162 provides a special price if two such calculators are purchased within a given time, by participants Z1 and Z2.

Figure 4:
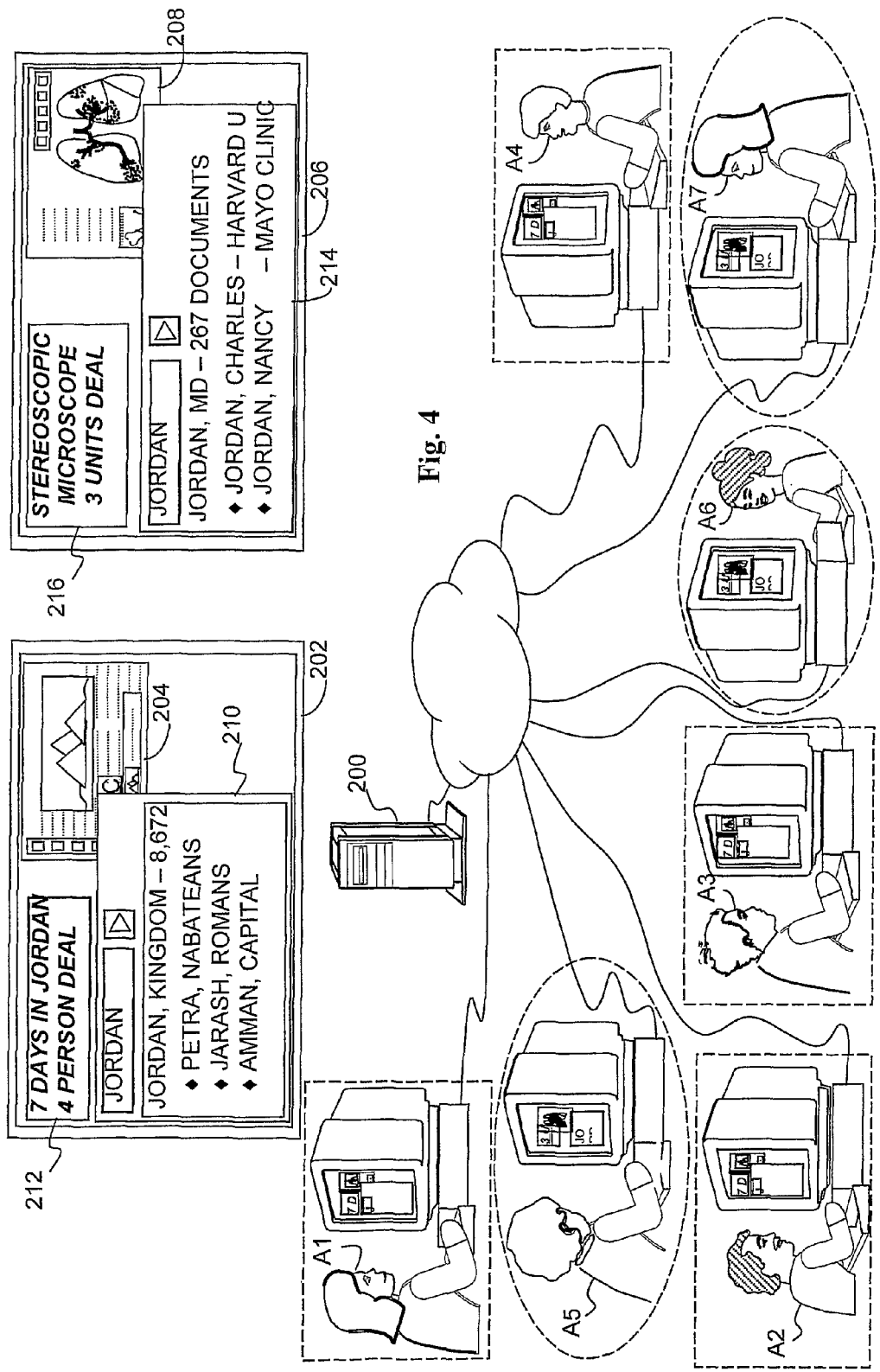
FIG. 4 is a simplified pictorial illustration of a system and methodology for selectably directing information to users of Internet resources from an external source in accordance with one embodiment of the present invention.

Reference is now made to FIG. 4, which is a simplified pictorial illustration of a system and methodology for selectably directing information to users of Internet resources from an external source in accordance with one embodiment of the present invention.

As seen in FIG. 4, multiple users, each connected to the Internet, are interacting via various whiteboards, which are dedicated to various subjects and resident on one or more servers 200. In the example of FIG. 4, participants A1, A2, A3 and A4 are using a whiteboard 202, which is dedicated by participants A1, A2, A3 and A4 to the subject of geography, as indicated by frame 204. Participants A5, A6, and A7 are using a whiteboard 206, which is dedicated by participants A5, A6, and A7 to the subject of biology, as indicated by frame 208.

As seen in FIG. 4, one of the participants A1, A2, A3 and A4 has placed onto whiteboard 202 an additional frame, indicated by reference numeral 210, which in the example of FIG. 4, is a search engine web page. The web page appearing in frame 210 can be any suitable web page available on the server 200 or anywhere in the Internet.

In this example, the participants A1, A2, A3 and A4 use the search engine web page to search for "Jordan". Server 200, monitoring the activity of the participants A1, A2, A3 and A4, senses that the subject to which the whiteboard 202 is dedicated to is geography. Thus, server 200 adapts the search for "Jordan" to the subject of geography, as indicated by the items retrieved and presented to the participants A1, A2, A3 and A4 by the search engine within frame 210. This may be achieved, for example, by automatically adding a keyword such as "geography" to the search term "Jordan".

In accordance with a preferred embodiment of the present invention, server 200 senses that participants A1, A2, A3 and A4 share an interest in geography and in Jordan, and hence server 200 preferably pushes to all participants A1, A2, A3 and A4, non-user originated information, for example in the form of an advertisement, indicated by reference numeral 212. Preferably, advertisement 212 is adapted by server 200 to the shared interest of participants A1, A2, A3 and A4, namely geography and Jordan. In this example, the advertisement 212 offers a 7-day trip to Jordan.

It is a further feature of the present invention, that server 200 may sense the number of participants in the whiteboard activity, four in the present case, and adapt the advertisement 212 to the number of participants. Thus, the advertisement 212 provides a special price if four such trips are purchased within a given time by participants A1, A2, A3 and A4.

Referring to whiteboard 206, it is noted that one of the participants A5, A6 and A7 has placed onto whiteboard 206 an additional frame indicated by numeral 214 which, in the example of FIG. 4, is a search engine web page. The web page appearing in frame 214 can be any suitable web page available on the server 200 or anywhere in the Internet.

In this example, the participants A5, A6 and A7 use the search engine web page to search for "Jordan". Server 200, monitoring the activity of the participants A5, A6 and A7, senses that the subject to which the whiteboard 206 is dedicated to is biology. Thus, server 200 adapts the search for "Jordan" to the subject of biology, as indicated by the items retrieved and presented to the participants A5, A6 and A7 by the search engine within frame 214.

In accordance with a preferred embodiment of the present invention, server 200 senses that participants A5, A6 and A7 share an interest in biology, and hence server 200 preferably pushes to all participants A5, A6 and A7, non-user originated information, for example in the form of an advertisement, indicated by reference numeral 216. Preferably, advertisment 216 is adapted by server 200 to the shared interest of participants A5, A6 and A7, namely biology. In this example, the advertisment 216 offers a stereoscopic microscope.

It is a further feature of the present invention, that server 200 senses the number of participants in the whiteboard activity, four in the present case, and adapts the advertisement 216 to the number of participants. Thus, the advertisement 216 provides a special price if three such stereoscopic microscopes are purchased within a given time, by participants A5, A6 and A7.

Figure 5:
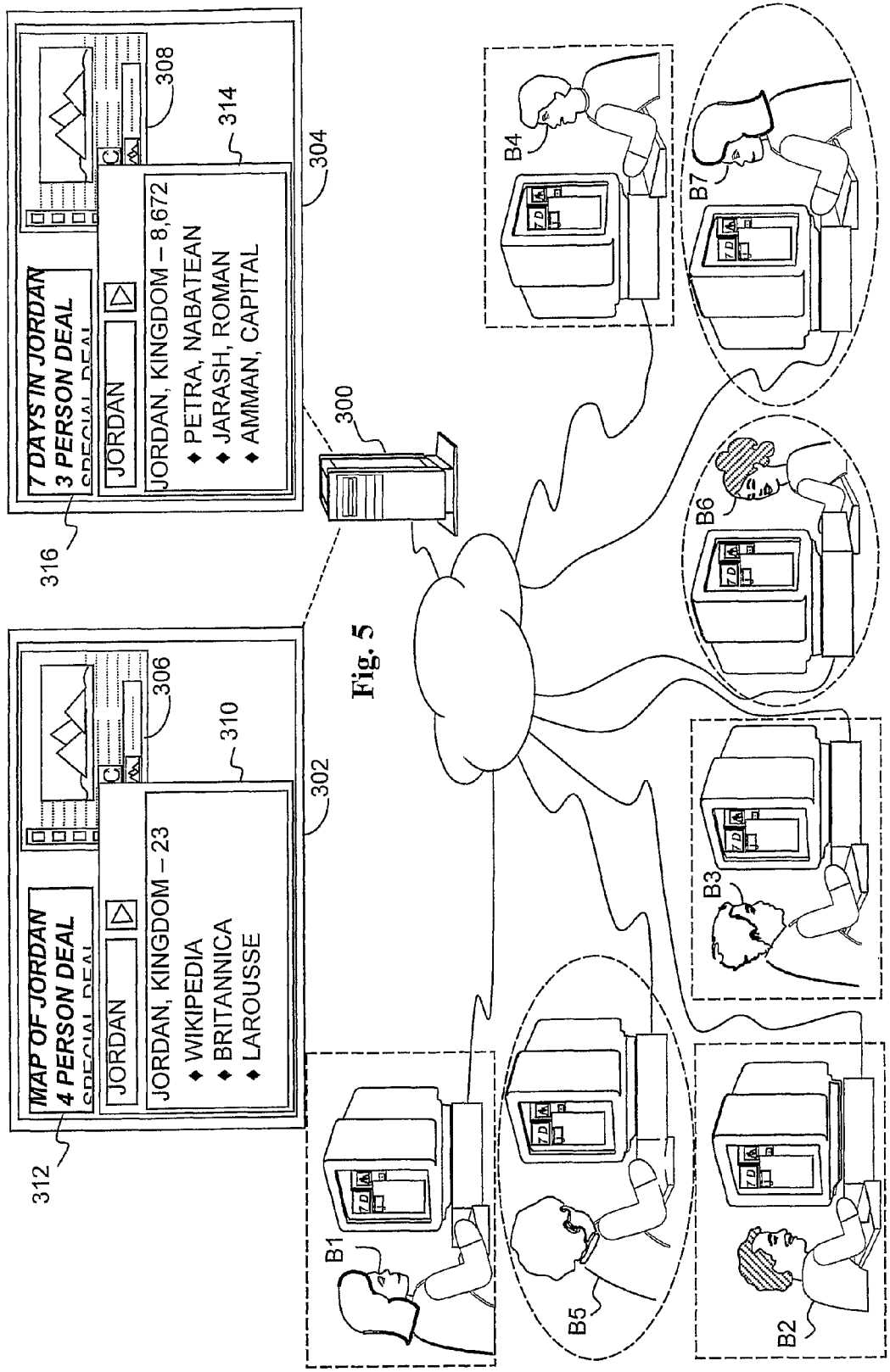
FIG. 5 is a simplified pictorial illustration of a system and methodology for selectably directing information to users of Internet resources from an external source in accordance with another embodiment of the present invention.

Reference is now made to FIG. 5, which is a simplified pictorial illustration of a system and methodology for selectably directing information to users of Internet resources from an external source in accordance with another embodiment of the present invention.

As seen in FIG. 5, multiple users, each connected to the Internet, are interacting via various whiteboards which are dedicated to various subjects and resident on one or more servers 300. In the example of FIG. 5, participants B1, B2, B3 and B4 are using a whiteboard 302, and participants B5, B6, and B7 are using a whiteboard 304. Both whiteboards 302 and 304 are dedicated, preferably by their respective users, to geography, as indicated by frames 306 and 308 respectively.

As seen in FIG. 5, one of the participants B1, B2, B3 and B4 has placed onto whiteboard 302 an additional frame indicated by numeral 310 which, in the example of FIG. 5, is a search engine web page. The web page appearing in frame 310 can be any suitable web page available in the server 300 or anywhere in the Internet.

In this example, the participants B1, B2, B3 and B4 use the search engine web page to search for "Jordan". Server 300, monitoring the activity of the participants B1, B2, B3 and B4, senses that the subject to which the whiteboard 302 is dedicated to is geography. In accordance with a preferred embodiment of the present invention, server 300 may also sense that the level of use of the whiteboard 302 is an elementary school level. This may be achieved, for example, by analyzing stored profiles of the participants. Accordingly, server 300 preferably adapts the search for "Jordan" to the subject of geography at an elementary school level, as indicated by the items retrieved and presented to the participants B1, B2, B3 and B4 by the search engine within frame 310. This also may be achieved by supplying information from stored profiles of the participants to a search engine.

In accordance with another preferred embodiment of the present invention, server 300 senses that participants B1, B2, B3 and B4 share an interest in geography and in Jordan, and hence server 300 preferably pushes to all participants B1, B2, B3 and B4, non-user originated information, for example in the form of an advertisement, indicated by reference numeral 312. Preferably, advertisment 312 is adapted by server 300 to the shared interest of participants B1, B2, B3 and B4, namely geography and Jordan, and to their age level, as indicated by their level of use. Thus, in this example, the advertisment 312 offers a map of Jordan.

It is a further feature of the present invention, that server 300 senses the number of participants in the whiteboard activity, four in the present case, and adapts the advertisement 312 to the number of participants. Thus, the advertisement 312 provides a special price if four such maps are purchased within a given time, by participants B1, B2, B3 and B4.

Referring to whiteboard 304, it is seen that one of the participants B5, B6 and B7 has placed onto whiteboard 304 an additional frame, indicated' by reference numeral 314 which, in the example of FIG. 5, is a search engine web page. The web page appearing in frame 314 can be any suitable web page available in the server 300 or anywhere in the Internet.

In this example, the participants B5, B6 and B7 use the search engine web page to search for "Jordan". Server 300, monitoring the activity of the B5, B6 and B7, senses that the geography is the subject of the whiteboard 304. Thus, server 300 adapts the search for "Jordan" to the subject of geography. Additionally, server 300 also senses that the level of use of the whiteboard 304, preferably by referring to profile information relating to the participants, preferably available via registration and/or accumulated over time. Server 300 determines that all user are adults and thus server 300 adapts the search for "Jordan" to the subject of geography at an adult level, as indicated by the items retrieved and presented to the participants B5, B6 and B7 by the search engine within frame 314.

In accordance with a preferred embodiment of the present invention, server 300 senses that participants B5, B6 and B7 share an interest in geography, and hence server 300 preferably pushes to all participants B5, B6 and B7, non-user originated information, for example in the form of an advertisement, indicated by reference numeral 316. Preferably, advertisment 316 is adapted by server 300 to the shared interest of participants B5, B6 and B7, namely geography and Jordan, and also to their age, as indicated by their level of use of whiteboard 304. In this example, the advertisement 316 offers a 7-day trip to Jordan.

It is a further feature of the present invention, that server 300 senses the number of participants in the whiteboard activity, three in the present case, and adapts the advertisement 316 to the number of participants. Thus, the advertisement 316 provides a special price if three such deals are purchased within a given time, by participants B5, B6 and B7.

Figure 6:
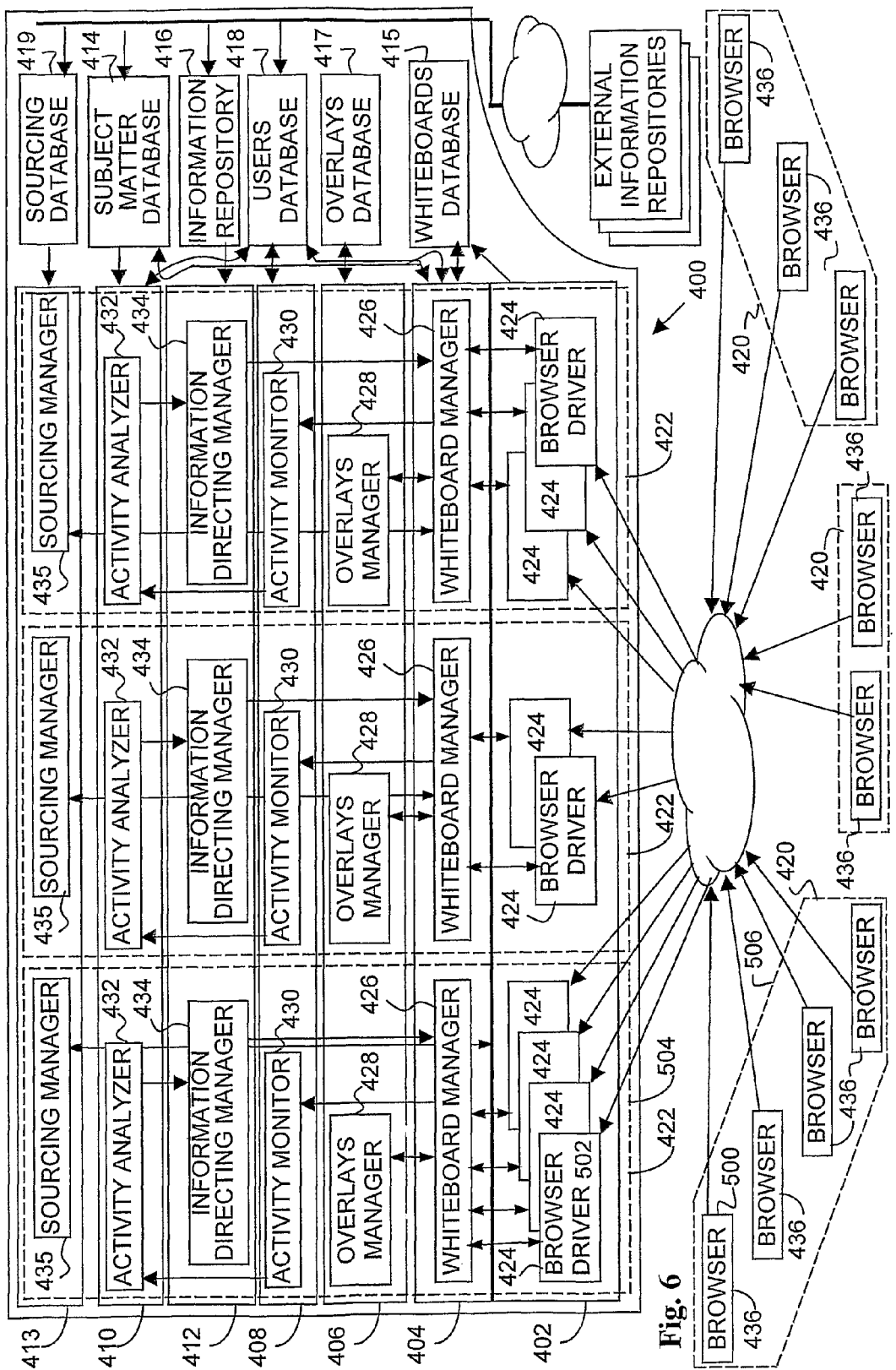
FIG. 6 is a simplified block diagram illustration of a browser-server structure providing the systems and methodologies illustrated in FIGS. 1-5.

Reference is now made to FIG. 6, which is a simplified block diagram illustration of a browser-server structure providing the functionality described hereinabove and illustrated in FIGS. 1-5.

As seen in FIG. 6, a server 400, which corresponds to server 100 (FIGS. 1-3), server 200 (FIG. 4) and server 300 (FIG. 5), preferably contains the following modules:

a browser manager module 402;
a whiteboard manager module 404;
a whiteboard overlays manager module 406;
a whiteboard activity monitoring module 408;
a whiteboard activity analyzer module 410;
a whiteboard information directing manager module 412;
a sourcing manager module 413;
a subject matter database 414 preferably accessible by the activity analyzer module 410;
a whiteboard database 415 preferably accessible by the whiteboard manager module 404 and/or the browser manager module 402;
an information repository 416 preferably accessible by the information directing manager module 412;
an overlays database 417 preferably accessible by the whiteboard overlays manager module 406;
a users database 418 preferably accessible by the activity monitoring module 408 and/or the activity analyzer module 410 and/or the whiteboard manager module 404; and
a sourcing database 419 preferably accessible by the sourcing manager module 413.

Preferably for each group 420 of users participating in a whiteboard, the server 400 performs a group of tasks 422. Each group of tasks 422 contains the following tasks:

browser driver tasks 424, typically equal in number to the number of participants in the whiteboard, here also termed "users";
a whiteboard manager task 426 preferably communicating with the browser driver tasks 424;
a whiteboard overlays manager task 428 preferably communicating with the manager task 426;
a whiteboard activity monitoring task 430 preferably communicating with the whiteboard manager task 426;
a whiteboard activity analyzer task 432 preferably communicating with the activity monitoring task 430;
a whiteboard information directing manager task 434 preferably communicating with the activity analyzer task 432 and with the whiteboard manager task 426; and
a sourcing manager task 435 preferably communicating with the activity browser driver tasks 424 and with the sourcing database 419. Preferably, the sourcing manager tasks 435 also communicate with external databases operated by external services offering products for sale, such as Web suppliers.

As seen in FIG. 6, a plurality of web browsers 436, normally equal in number to the number of users in a group 420, participating in the whiteboard activities described above with reference to FIG. 1, communicates via the Internet with a corresponding number of browser driver tasks 424. It is appreciated that the number of web browsers 436 and the corresponding number of browser drivers 424 changes over time depending on the number of active users currently participating in whiteboard activities.

At the option of the users, one or more whiteboards may be opened on server 400. In the example of FIGS. 1-3, three whiteboards are opened. For each whiteboard the server 400 assigns a whiteboard manager task 426. Associated with each whiteboard manager task 426 is a whiteboard activity monitoring task 430, an overlay manager task 428 and an information directing manager task 434. Each activity monitoring task 430 monitors the activity on a corresponding whiteboard and outputs to a corresponding activity analyzer task 432.

The users database 418 stores personalizing information regarding each user and provides this information to the plurality of activity analyzer tasks 432. The subject matter database 414 stores information, such as information relating to arithmetic, geometry and biology, and supplies this information to the plurality of activity analyzer tasks 432.

The information repository 416 stores information, such as advertisements, to be pushed to users, and supplies this information to the plurality of information directing manager tasks 434. It is appreciated that subject matter database 414 and information repository 416 may be located within server 400 and/or may be remotely located and shared and accessible via the Internet.

The subject matter database 414 may include, in a preferred embodiment, a search engine and/or an information directory. The information repository 416 may be, for example, a web advertising management engine, such as Google Ads.

There follows a description of an example how the browser-server structure described in FIG. 6 performs the functionality of FIG. 1 for participants A, B, C and D, who are using a whiteboard 102 for learning arithmetic.

One participant, for example participant A, operates his browser 436, designated in FIG. 6 by reference numeral 500, to access the server 400. Server 400 responds to the browser 500, preferably by operating a browser driver task 424, here designated by reference numeral 502, of browser manager module 402. Participant A preferably signs in to the server 400 and requests initiation of a new whiteboard. Browser driver task 502 activates a new whiteboard manager task 426, a new overlays manager task 428, a new activity monitor task 430, a new activity analyzer task 432, a new information directing manager task 434 and a new sourcing manager task 435, all in the framework of the group of tasks 422 designated by reference numeral 504.

After initiating the group of tasks 504, the browser driver task communicates information between the browser 500 and the whiteboard manager task 426 of group 504, and optionally between browser 500 and other tasks that wish to communicate with browser 500.

Preferably, participant A of FIG. 1 communicates, via browser 500 and browser driver 502, with the whiteboard manager task 426 of group 504 and designates the whiteboard for mathematics, for example, by requesting loading of a mathematics toolbox, such as toolbox 114 of FIG. 1. The whiteboard manager task 426 accesses the subject matter database 414 to retrieve the selected toolbox. Preferably, participant A, typically a mathematics instructor, had already created his own version of a mathematics toolbox, as recorded in the participant A's record in the users database 418. Such actions of participant A are monitored by the activity monitoring task 428 of group 504 and reported to the activity analyzer task 432 of group 504.

Following participant A, participants B, C and D operate their respective browsers 436 of the group 420 designated by reference numeral 506. Each of these browsers 436 communicates with the server 400 via a respective browser driver task 424 within group 504, as seen in FIG. 6. After signing in to the server 400, each of participants B, C and D selects to join the whiteboard created by participant A, and is therefore connected, by the browser driver task 424 associated therewith, to the whiteboard manager task 426 of group 504.

Preferably, the whiteboard manager task 426 of group 504 communicates all the activities of the participants A, B, C and D within the framework of the whiteboard to all the browser drivers 424 of the group 504 to be forwarded to the respective browsers 436. Preferably, all the activities of the participants A, B, C and D within the framework of the whiteboard are monitored by the activity monitoring task 430, and the results of this monitoring are forwarded to the activity analyzer task 432 of group 504. Thus, during use of the whiteboard, each participant sees everything that every participant contributes.

Preferably, when a participant in a whiteboard activity, such as participants A, B, C and D participating in whiteboard 102 of FIG. 1, wishes to add information to the whiteboard, the participant requests control of the whiteboard from the whiteboard manager task 426. The whiteboard manager task 426 preferably requests the overlays manager 428 to create a new overlay for that participant and then enters all the added information entered by that participant into this new overlay, until another participant assumes control over the whiteboard. Participants can later remove, replace, return or otherwise manipulate their own overlays and overlays of other participants in that whiteboard.

The activity analyzer task 432 of group 504 collects information about the participants, their number and their activities within the framework of the whiteboard and detects their mutual interests, average level, gender, locality and similar characteristics. When such common interest is determined, the activity analyzer task 432 sends this information, preferably in the form of one or more keywords, to the information directing manager task 434.

The information directing manager task 434 receives the information sent by the analyzer task 432 of group 504 and interrogates the information repository 416 for information items complying with the common interest detected by the analyzer task 432. If such an information item, for example a suitable advertisement, is located, the information directing manager task 434 edits the information item and sends the edited item to the whiteboard manager 404 of group 504 to be displayed to participants A, B, C and D via the browser driver tasks 424 and the browsers 436, preferably in a separate frame. In the example of whiteboard 102 of FIG. 1, in which the common interest of the participants is mathematics for the lower grades, the information directing manager task 434 finds and displays an advertisement for an arithmetic calculator, and provides a special price if four such calculators are purchased.

If the information item contains an advertisement for a product or a service, such as advertisement 110 of FIG. 1, and at least one of the participants A, B, C, and D clicks on the advertisement, or otherwise shows an interest in the advertised product or service, the whiteboard manager task 426 communicates with the sourcing manager task 435 to receive more information about the advertised product or service. The sourcing manager task 435 communicates with the sourcing database 419, and/or with external databases operated, for example, by online stores, to receive specific information and final price quotes, such as a special price for a group purchase based on the number of participants currently using the whiteboard.

The sourcing manager task 435 receives the additional information from the sourcing database 419 or from the external databases, edits the information, and provides it to the whiteboard manager to be displayed to all the participants A, B, C and D, preferably via the browser driver tasks 424 and the browsers 436 associated with each participant and preferably in a separate frame. If the participants of group 504 agree to purchase the advertised product or service, the sourcing manager task 435 communicates with the sourcing database 419 or the external databases and concludes the purchase. When the sourcing manager task 435 receives confirmation of the purchase it sends the confirmation to the whiteboard manager to be displayed to the participants.

Figure 7:
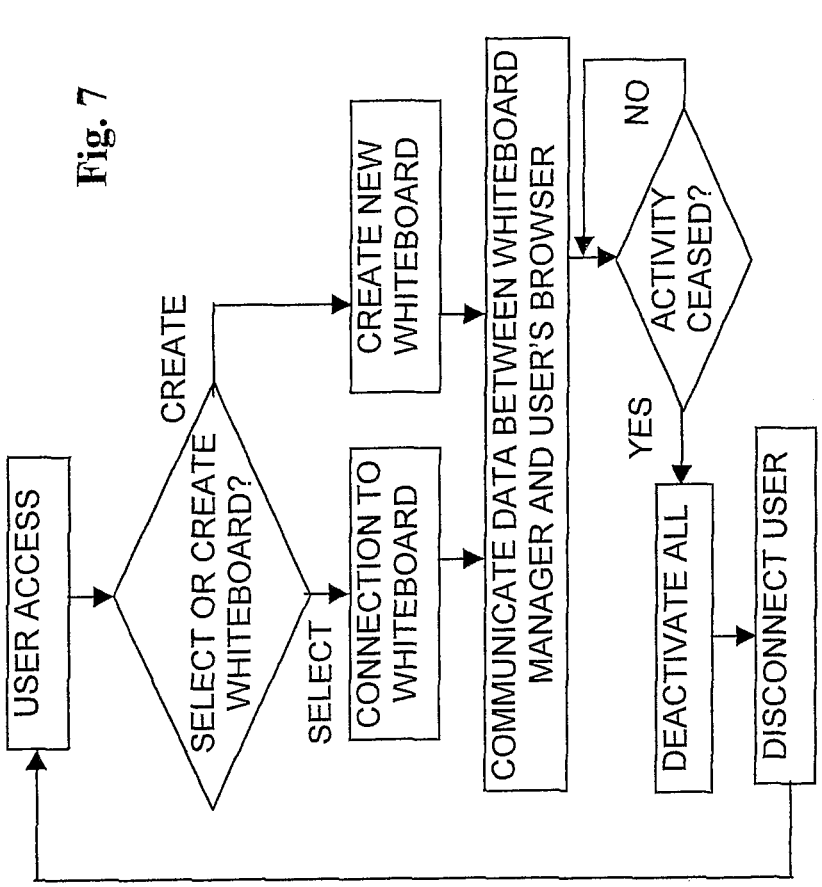
FIG. 7 is a simplified flow chart illustrating the operation of a browser manager module forming part of the browser-server structure of FIG. 6.

Reference is now made to FIG. 7, which is a simplified flow chart illustrating the operation of a browser manager module, such as browser manager module 402, forming part of the browser-server structure of FIG. 6. As noted above, the browser manager module manages communication with the client browsers and operates the home page of the web services provided by server 400 in accordance with a preferred embodiment of the present invention.

As seen in FIG. 7, the functionality of the browser manager module includes a user access subroutine for managing user registration. Following user registration, a user may join an existing, active, whiteboard or alternatively may create a new whiteboard. If a new whiteboard is created, the browser manager module creates a set of tasks to operate the new whiteboard, as described hereinbelow with reference to FIG. 10. The browser manager module facilitates data communication between a whiteboard manager module, such as whiteboard manager module 404 and a client browser, such as client browser 436.

Preferably, the communication between the whiteboard manager module 404 and the client browser 436 is carried out by a whiteboard manager task, such as whiteboard manager task 426, and/or other tasks related thereto. Preferably, the browser manager supports a variety of browser software packages and versions, as well as a variety of markup languages, plug-ins and similar communication and presentation means. Thus, the browser manager module enables other whiteboard modules to be generic, and not to have to conform to the technical specifications of the client browsers 436.

Once activity on the whiteboard ceases, the browser manager module is operative to close the whiteboard. As seen in FIG. 6, the functionality of the browser manager module is carried out by several browser manager tasks 424, a task for each user's browser.

Figure 8:
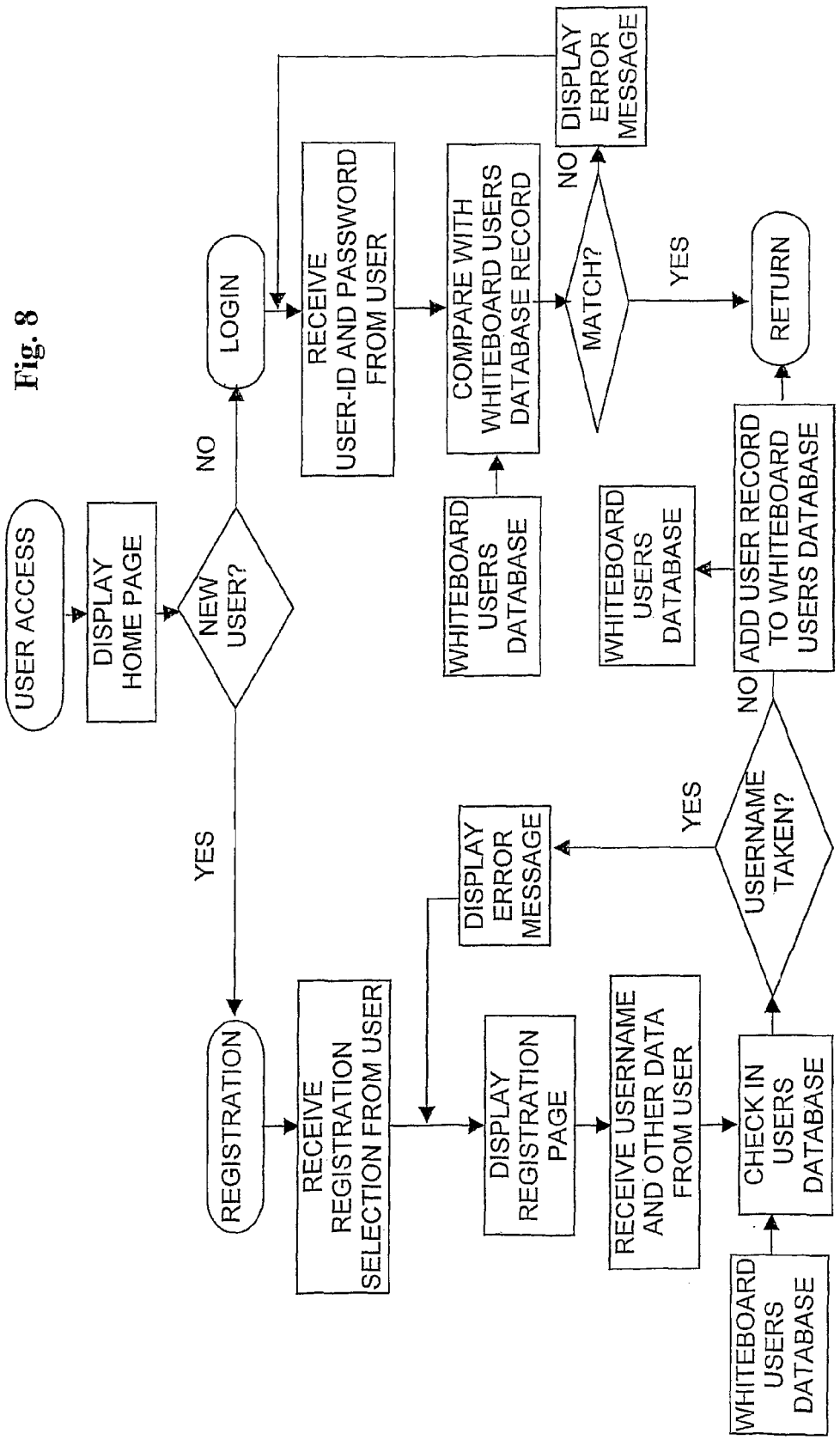
FIG. 8 is a simplified flow chart illustrating the operation of a user access subroutine useful in the operation of a browser manager as shown in FIG. 7.

Reference is now made to FIG. 8, which is a simplified flow chart illustrating the operation of a user access subroutine useful in the operation of a browser manager as shown in FIG. 7 in accordance with a preferred embodiment of the present invention.

As seen in FIG. 8, the functionality of the user access subroutine includes presenting a home page to the user and, preferably within the home page, admitting the user to the service provided by the server 400. The user can select between login to the service, if the user is already a registered user, or registration for the service as a new user. It is noted that a whiteboard users database which corresponds to users database 418 (FIG. 6) preferably participates in this functionality.

Figure 9:
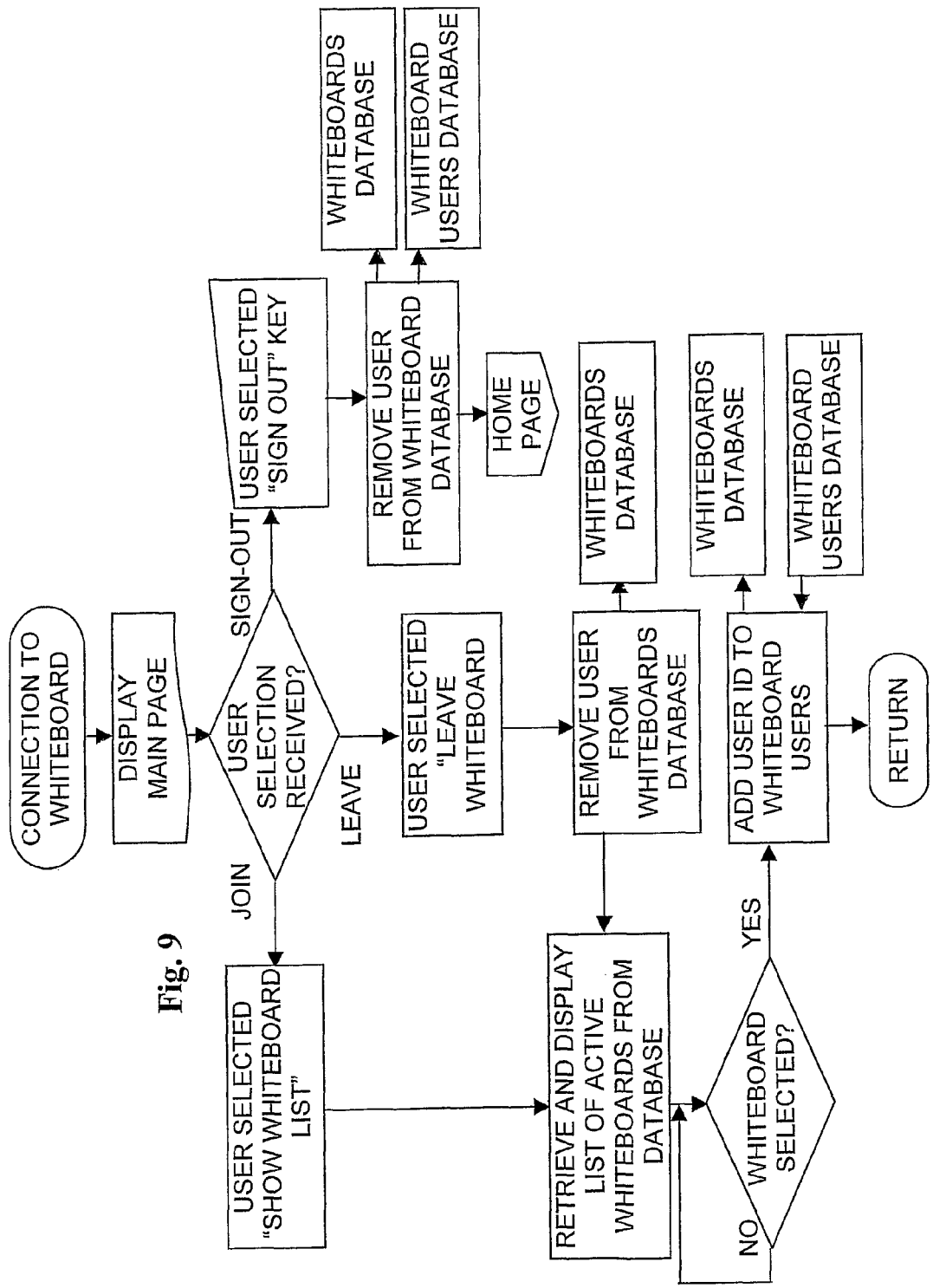
FIG. 9 is a simplified flow chart illustrating the operation of a connect to whiteboard subroutine useful in the operation of a browser manager as shown in FIG. 7.

Reference is now made to FIG. 9, which is a simplified flow chart illustrating the operation of a connection to whiteboard subroutine useful in the operation of a browser manager as shown in FIG. 7, in accordance with a preferred embodiment of the present invention. As seen in FIG. 9, when carrying out the functionality of the connect to whiteboard subroutine a main page is presented to the user and enables the user to request to join an active whiteboard, leave a whiteboard and sign-out of the service.

If the user requests to join an active whiteboard, a list of the currently active whiteboards is retrieved from the whiteboards database 415 (FIG. 6) and displayed to the user, preferably within the main page. The user selects the whiteboard which he wishes to join, preferably by clicking on the name or indication of the whiteboard in the displayed list. An indication of the user's identity is then added to the list of the users for the specific whiteboard in the whiteboard database.

If the user requests to leave the specific whiteboard, the indication of the user's identity is removed from the list of users for that whiteboard in the whiteboard database. Preferably, the list of currently active whiteboards is then displayed to the user together with a log out button, enabling the user to join a different whiteboard or to log out of the service.

If the user wishes to log out of the service, the indication of the user's identity is removed from the whiteboard database, and the main page is displayed to the user.

It is noted that a whiteboard users database which corresponds to users database 418 (FIG. 6) preferably participates in this functionality.

Figure 10:
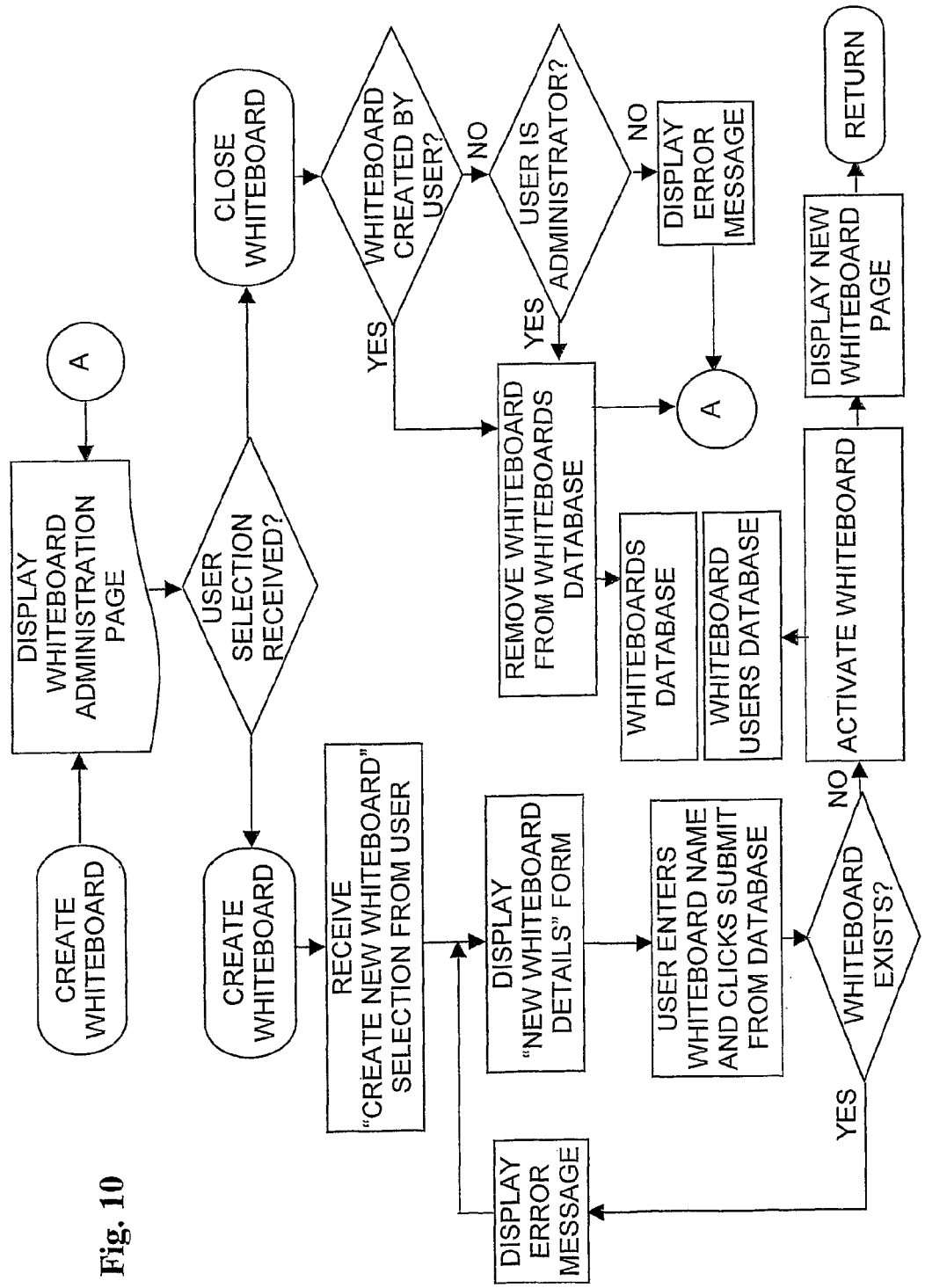
FIG. 10 is a simplified flow chart illustrating the operation of a create new whiteboard subroutine useful in the operation of a browser manager as shown in FIG. 7.

Reference is now made to FIG. 10, which is a simplified flow chart illustrating the operation of a create new whiteboard subroutine useful in the operation of a browser manager as shown in FIG. 7, in accordance with a preferred embodiment of the present invention. As seen in FIG. 10, when a user wishes to create a new whiteboard, a whiteboard administration page is displayed to the user, where the user can choose to create a new whiteboard or to close an active whiteboard.

If the user wishes to create a new whiteboard, the user is requested to enter the whiteboard details, including a whiteboard name, in a dedicated form. If the name selected by the user does not exist for another active whiteboard, the new whiteboard is activated and displayed in a new page. If the name does exist, the user is informed of this and is prompted to select another name for the new whiteboard.

If the user wishes to close an active whiteboard, the system checks whether the whiteboard was created by the user and whether the user is the administrator of the whiteboard. If neither of these is true, an error message is displayed to the user. Otherwise, the whiteboard is removed from the database. It is noted that a whiteboard users database which corresponds to users database 418 (FIG. 6) preferably participates in this functionality.

Figure 11:
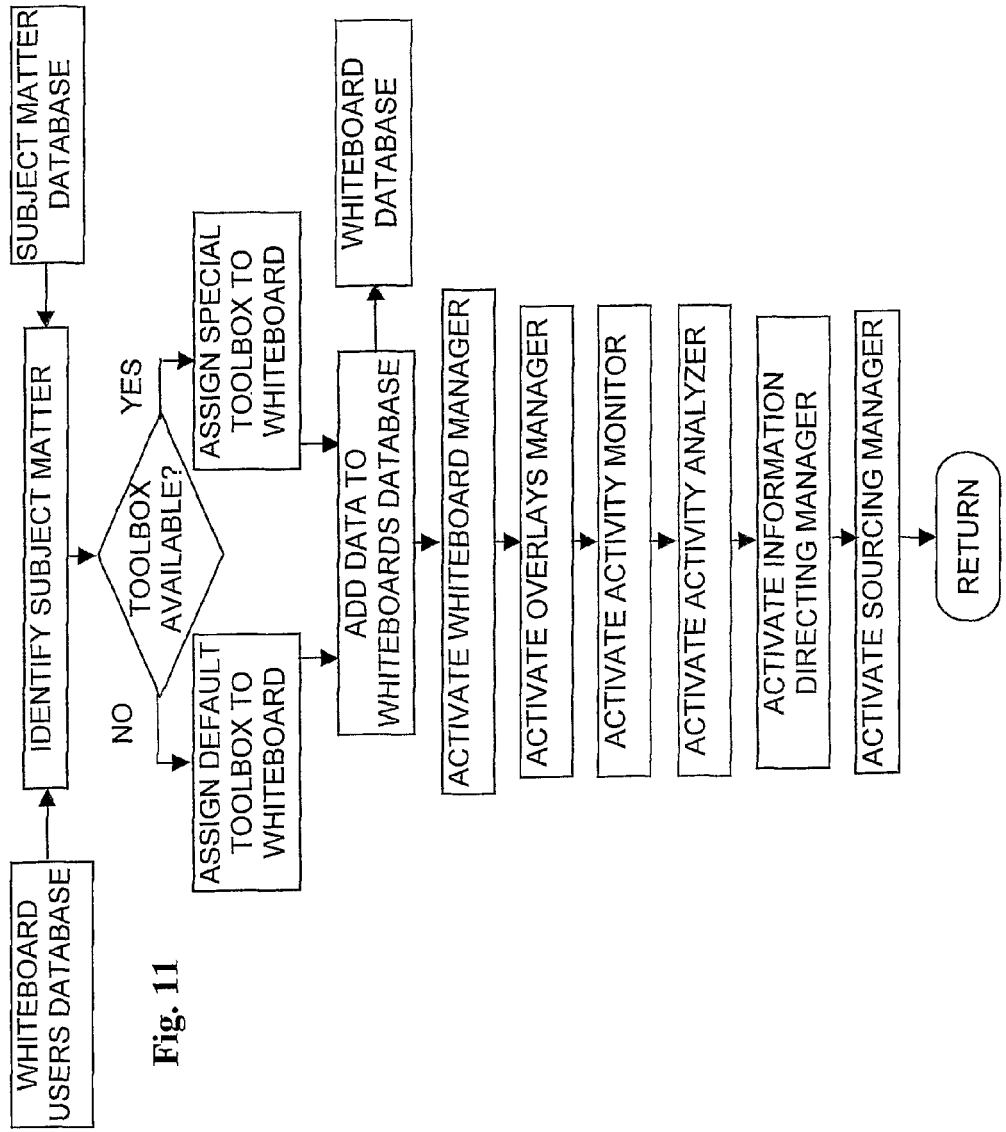
FIG. 11 is a simplified flow chart illustrating the operation of an activate whiteboard subroutine useful in the operation of a browser manager as shown in FIG. 7.

Reference is now made to FIG. 11, which is a simplified flow chart illustrating the operation of an activate whiteboard subroutine of FIG. 10, useful in the operation of a browser manager as shown in FIG. 7, in accordance with a preferred embodiment of the present invention. As seen in FIG. 11, the activate whiteboard subroutine first identifies the subject matter as entered by the user as a part of the whiteboard details. The activate whiteboard subroutine interrogates the subject matter database for special facilities available for the specific subject of the new whiteboard, such as a special toolbox.

The activate whiteboard subroutine also interrogates the users database if the user creating the whiteboard has some customized facilities for this type of whiteboard, such as a customized toolbox. If no special toolbox is found a default toolbox is assigned. The activate whiteboard subroutine then creates a new whiteboard record in the whiteboards database 415, containing the whiteboard details. The activate whiteboard subroutine then activates all the tasks pertaining to the new whiteboard, such as a whiteboard manager task, an overlays manager task, an activity monitor task, an activity analyzer task, an information directing manager task and a sourcing manager task. Preferably, these tasks are also recorded in the whiteboard record to be removed when the whiteboard is closed.

Figure 12:
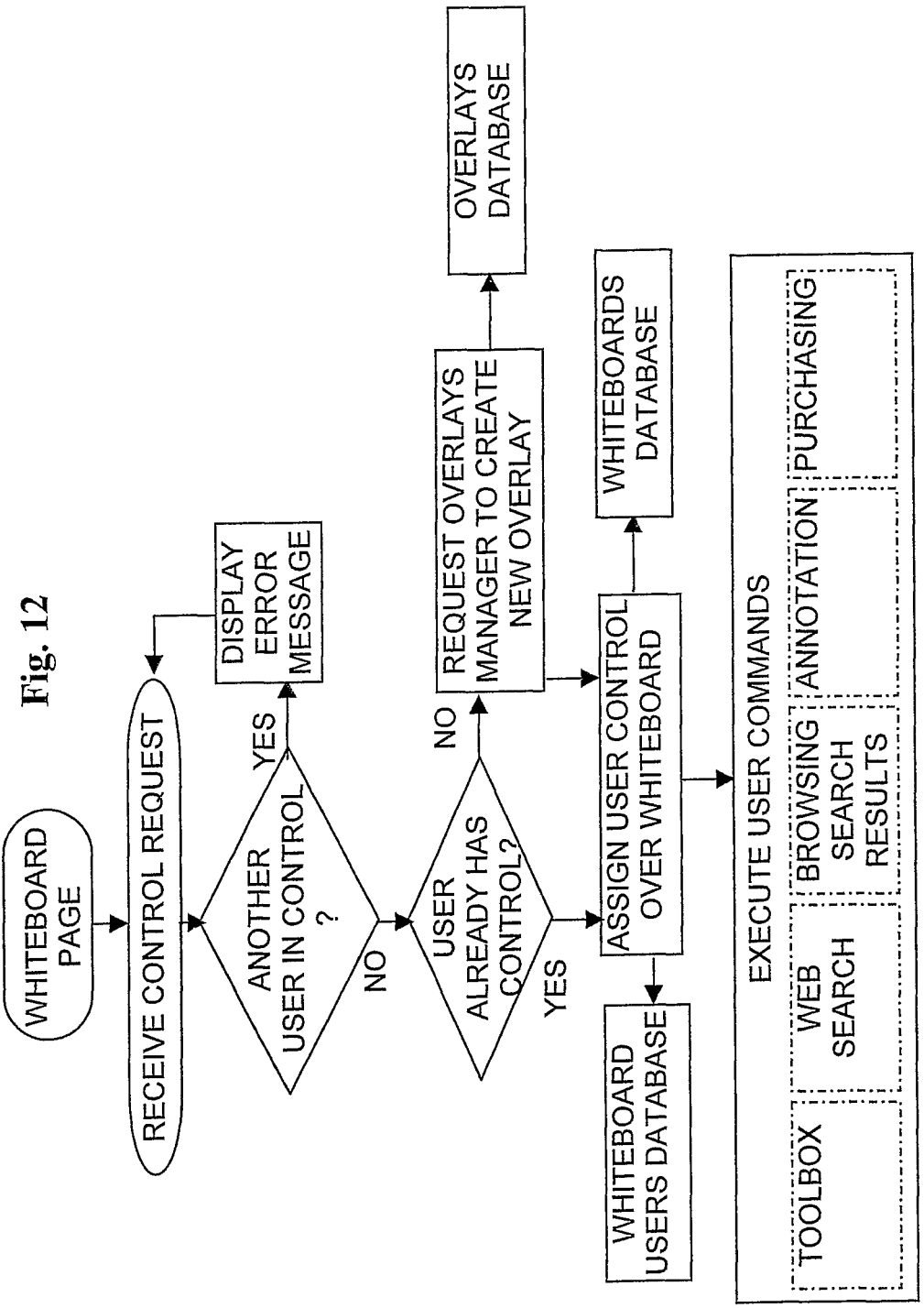
FIG. 12 is a simplified flow chart illustrating the operation of a whiteboard manager module forming part of the browser-server structure of FIG. 6.

Reference is now made to FIG. 12, which is a simplified flow chart illustrating the operation of a whiteboard manager module forming part of the browser-server structure of FIG. 6, in accordance with a preferred embodiment of the present invention.

As seen in FIG. 12, the whiteboard manager module includes functionality enabling a user to gain control of the whiteboard and thereafter to perform operations on the whiteboard using a collection of functionalities such as a toolbox, a web search functionality, a functionality for browsing the results of the web search, an annotation functionality, and a purchasing functionality. Preferably, a user requests control of an active whiteboard. If another user is currently in control, the user cannot gain control of the whiteboard, and an error message is displayed.

If no other user is currently in control, and the control of the whiteboard can be transferred to the user who requested it, the whiteboard manager module checks to see if the user is already in control of an overlay in this whiteboard. If the user is not in control of an overlay, the whiteboard manager module requests the overlays manager to create a new overlay associated with the user, who is then assigned control of the whiteboard. It is appreciated that the user may then perform operations within the overlay assigned to the user. Preferably, other users may remove the overlay associated with another user from the whiteboard displayed to them or return it to the whiteboard displayed to them but only the user for whom the overlay was created can modify the contents of the overlay.

Figure 13:
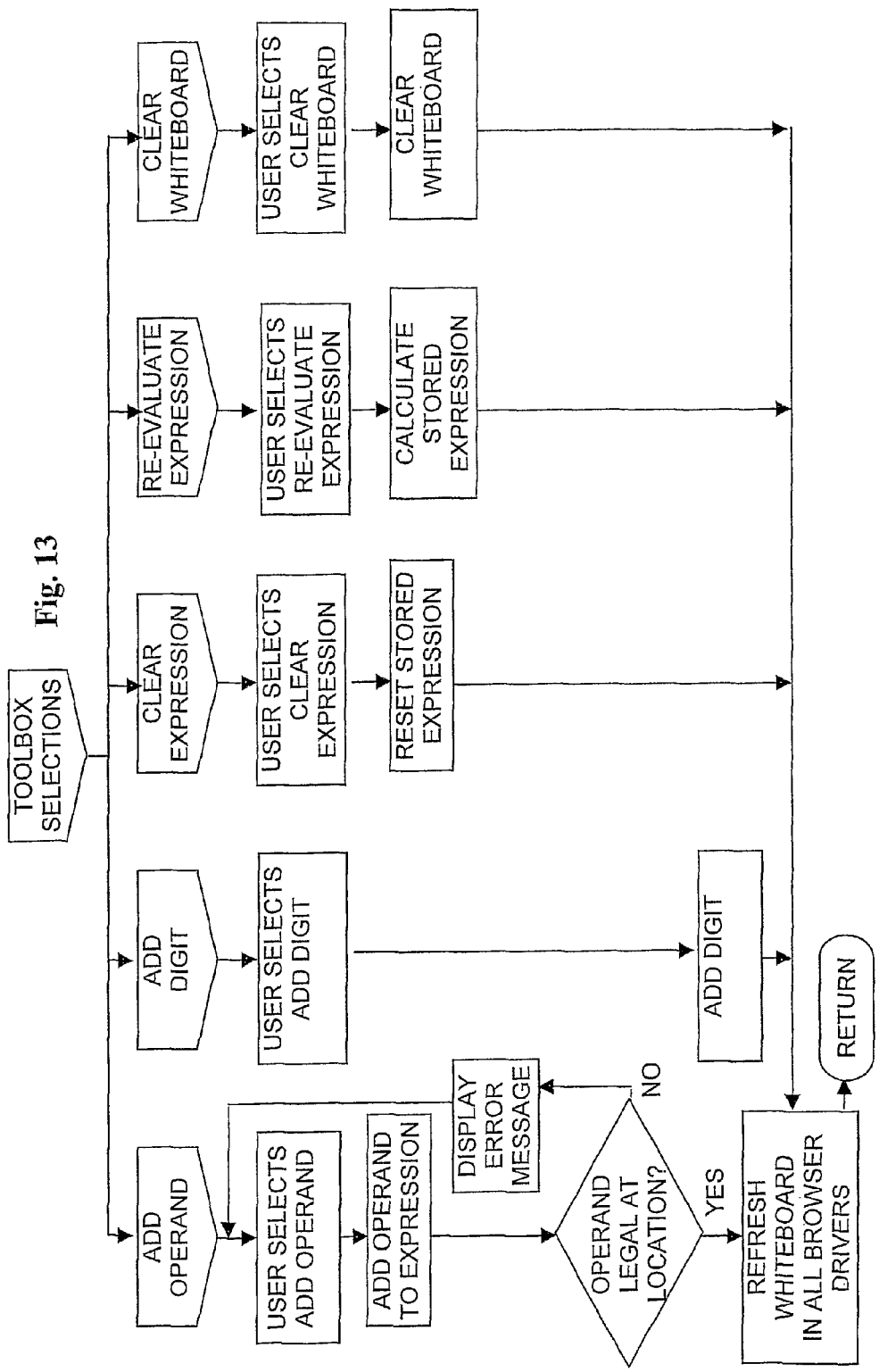
FIG. 13 is a simplified flow chart illustrating the operation of a toolbox subroutine useful in the operation of a whiteboard manager module as shown in FIG. 12.

Reference is now made to FIG. 13, which is a simplified flow chart illustrating the operation of a typical toolbox subroutine useful in the operation of a whiteboard manager module as shown in FIG. 12, in accordance with a preferred embodiment of the present invention.

As seen in FIG. 13, the toolbox includes a collection of tools that are useful with the subject matter of the whiteboard. FIG. 13 relates to a toolbox useful with a whiteboard whose subject matter is arithmetic. The toolbox subroutine of FIG. 13 includes five functions: add operand, add digit, clear expression, re-evaluate expression, and clear whiteboard. Each function has a corresponding toolbox key, such as keys 116 of FIG. 1. The toolbox subroutine preferably enables the user having control of the whiteboard to operate the toolbox functions and keys and thereafter instructs the browser driver tasks to refresh the whiteboard display in the browsers 436 (FIG. 6) of the group accessing the specific whiteboard, such as group 504 of FIG. 6.

Figure 14C:
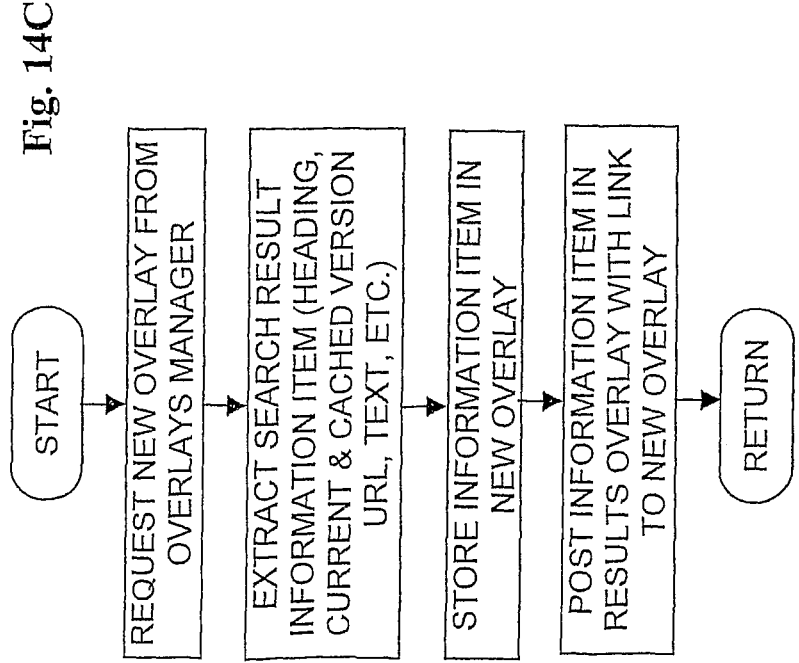
FIG. 14C is a simplified flow chart illustrating a subroutine forming part of the subroutines of FIGS. 14A and 14B.

Reference is now made to FIGS. 14A and 14B, which are each a simplified flow chart illustrating the operation of a different alternative of a web search subroutine useful in the operation of a whiteboard manager module as shown in FIG. 12, in accordance with a preferred embodiment of the present invention and to FIG. 14C which illustrates a subroutine forming part of the subroutines of FIGS. 14A and 14B.

As seen in FIG. 14A, the web search subroutine enables a user having control of the whiteboard to open a search frame, within a new overlay and to import an Internet web page of an Internet search engine, such as GOOGLE®, into the frame. The user can then use the Internet search engine to draft a query and retrieve a set of search results, which will be displayed in the whiteboard's search frame. The whiteboard then instructs the browser driver tasks to refresh the whiteboard display in the browsers 436 (FIG. 6) of the group accessing the specific whiteboard, such as group 504 of FIG. 6. Thus, all the participants are able to follow the search activity and view the search results.

As seen in FIG. 14B, the web search subroutine enables a user having control of the whiteboard to draft a query, which is then sent to an Internet search engine. The web search subroutine then collects the search results into a new overlay and instructs the browser driver tasks to refresh the whiteboard display in the browsers 436 (FIG. 6) of the group accessing the specific whiteboard, such as group 504 of FIG. 6. Thus, all the participants are able to follow the search activity and view the search results.

FIG. 14C illustrates a subroutine which forms part of the "update whiteboard manager" step in the subroutine of FIG. 14A and forms part of the "re-write each result URL and place in new overlay" step in FIG. 14B. As seen in FIG. 14C, a new overlay is requested from the overlay manager. The search result information is extracted and then stored in the new overlay. The information is posted in the existing results overlay with a link to the new overlay. The subroutine of FIG. 14C typically is carried out for every information item retrieved by the search engine.

Figure 15A:
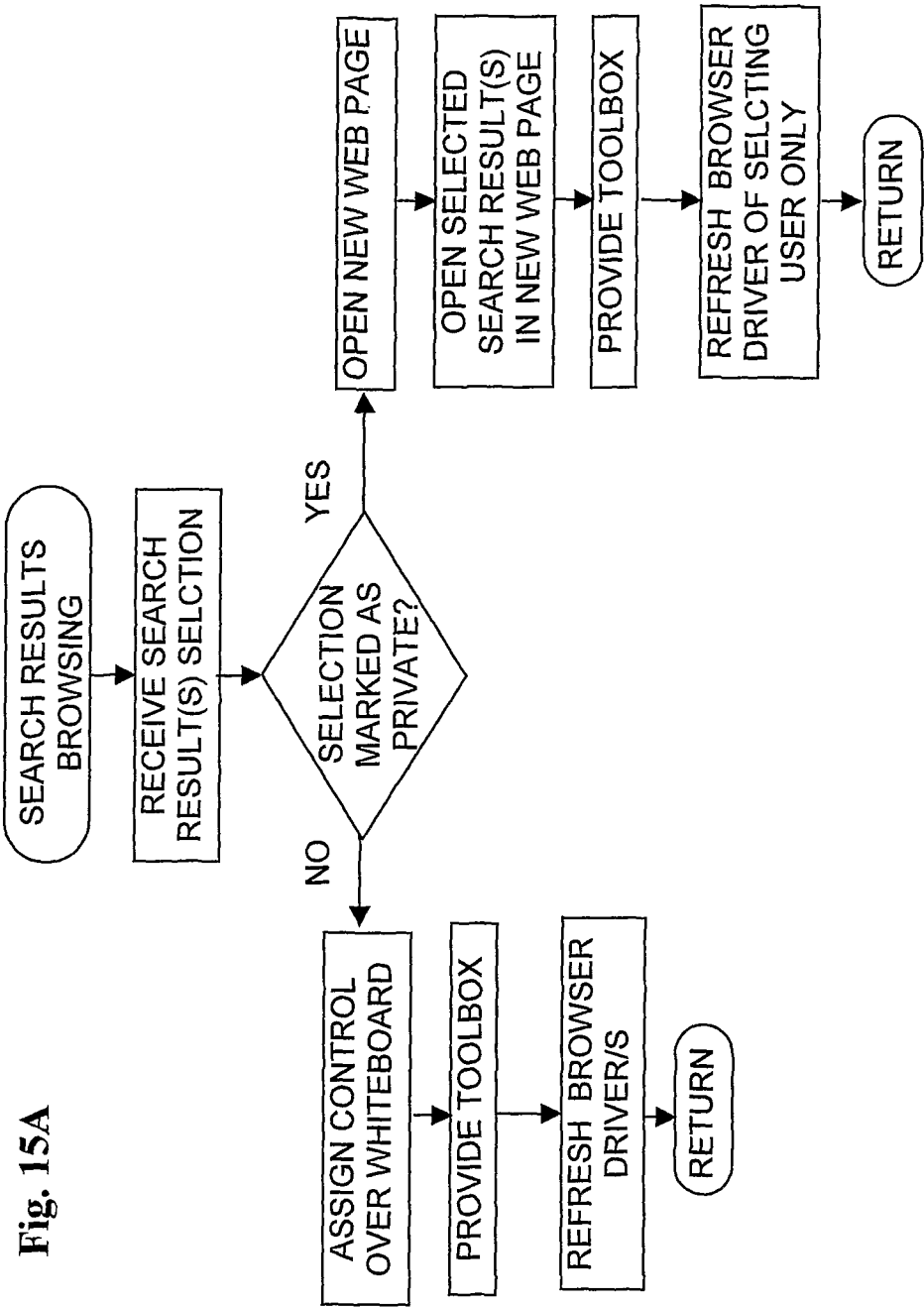
FIGS. 15A, 15B and 15C are together a simplified flow chart illustrating the operation of a search results browsing subroutine useful in the operation of a whiteboard manager module as shown in FIG. 12.
Figure 15B:
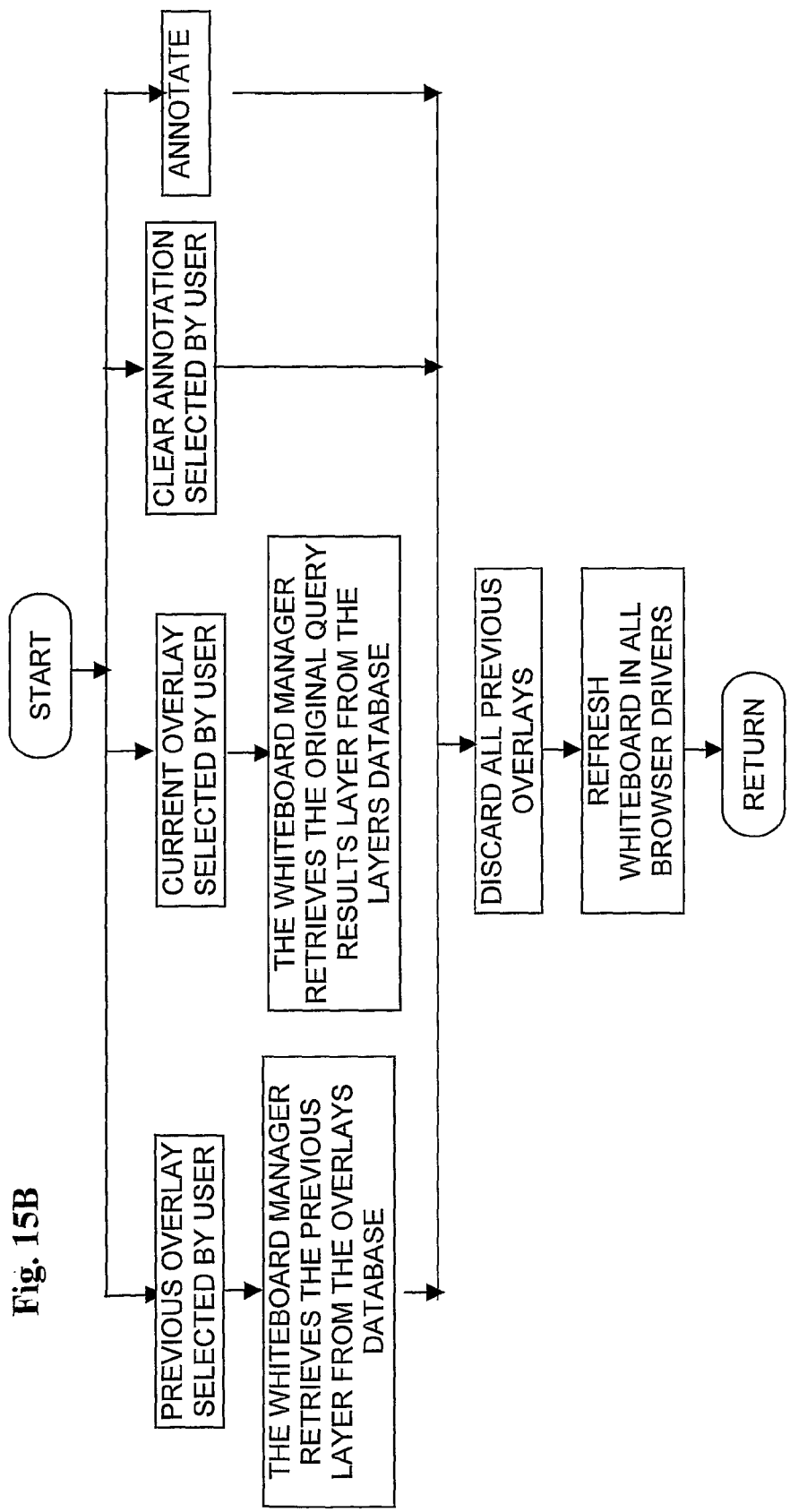
Figure 15C:
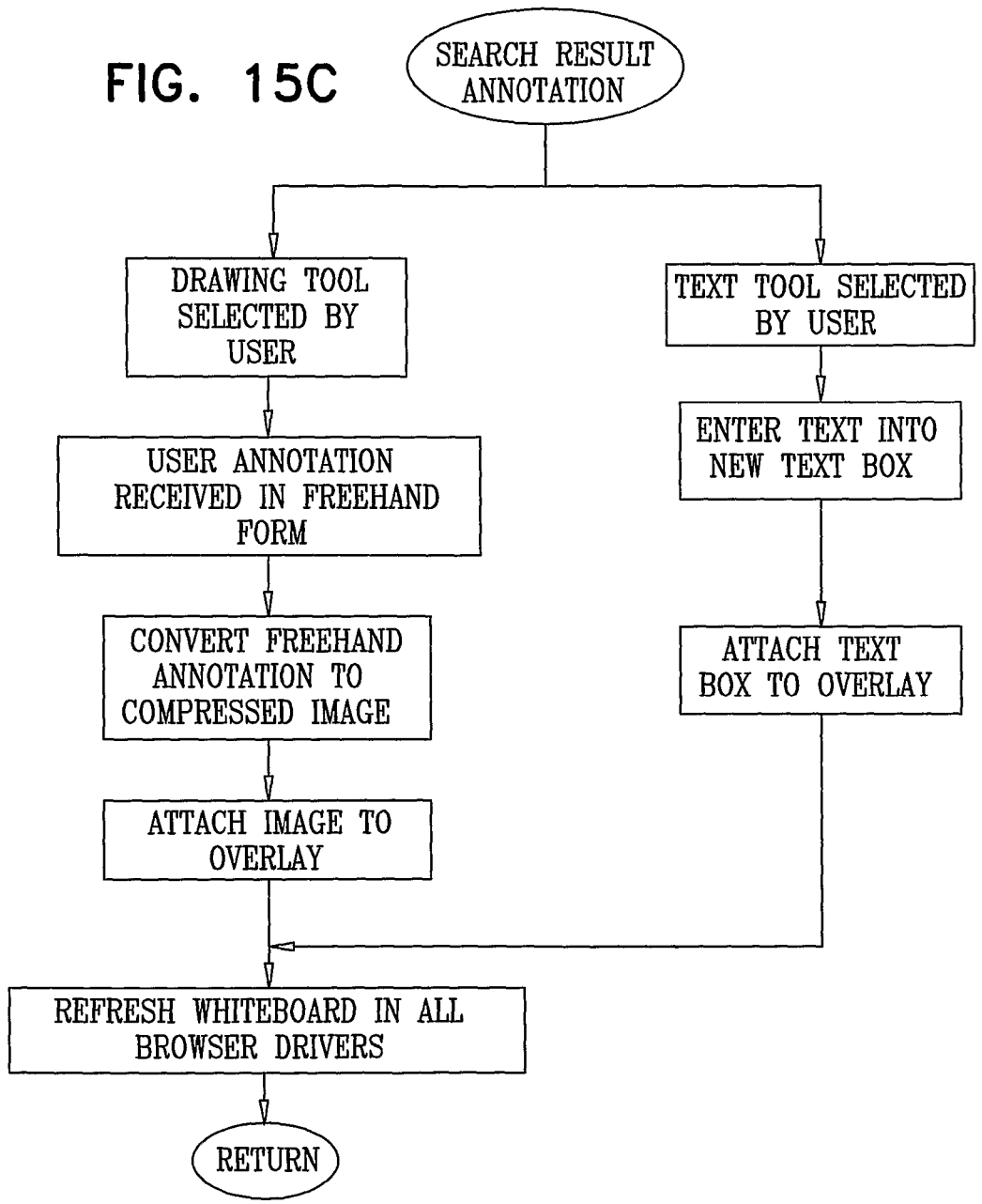

Reference is now made to FIGS. 15A, 15B and 15C, which are together a simplified flow chart illustrating the operation of a search results browsing subroutine useful in the operation of a whiteboard manager module as shown in FIG. 12, in accordance with a preferred embodiment of the present invention.

The search results browsing subroutine preferably enables the participants in a whiteboard to browse the results of a web search performed in accordance with the web search subroutine of FIGS. 14A, 14B and 14C.

As seen in FIGS. 15A-15C, a user, who is a participant in the whiteboard presenting search results, and who is currently in control of the whiteboard, selects one or more items from a list of search results. This selection may be, for example, by clicking on an item, by checking a checkbox associated with a title, or in any other suitable manner.

If the user wishes to view a search result before it appears on the whiteboard, that user may designate the search result as being "private". In such a case, the search results browsing subroutine opens a new web page and inserts the retrieved information into the new web page. A toolbox is then provided as illustrated in FIG. 15B. The search results browsing subroutine then instructs the browser driver task serving the designating user to update only the browser of the designating user.

If the search results are not designated "private", control of the whiteboard passes to the user who first requested a search result. The search results browsing subroutine then loads the retrieved information into the current search overlay and a toolbox is provided as illustrated in greater detail in FIG. 15B. The search results browsing subroutine then instructs the browser driver tasks to update the browsers of all the participants in the whiteboard.

FIG. 15B illustrates a toolbox subroutine that displays four selectable functions to the user: previous overlay, current overlay, clear annotation and annotate. If the user selects the previous overlay, the whiteboard manager retrieves the previous layer from the overlays database. If the current overlay is selected by the user, the whiteboard manager retrieves the overlay containing results of the query from the overlays database.

In each of the above two cases and also if clear annotations or annotations is selected by the user, all previous overlays are discarded and the whiteboard is refreshed in all browser drivers.

Reference is now made to FIG. 15C, which illustrates a preferred annotation subroutine. This subroutine includes two options, freehand annotations and text annotations.

Figure 16:
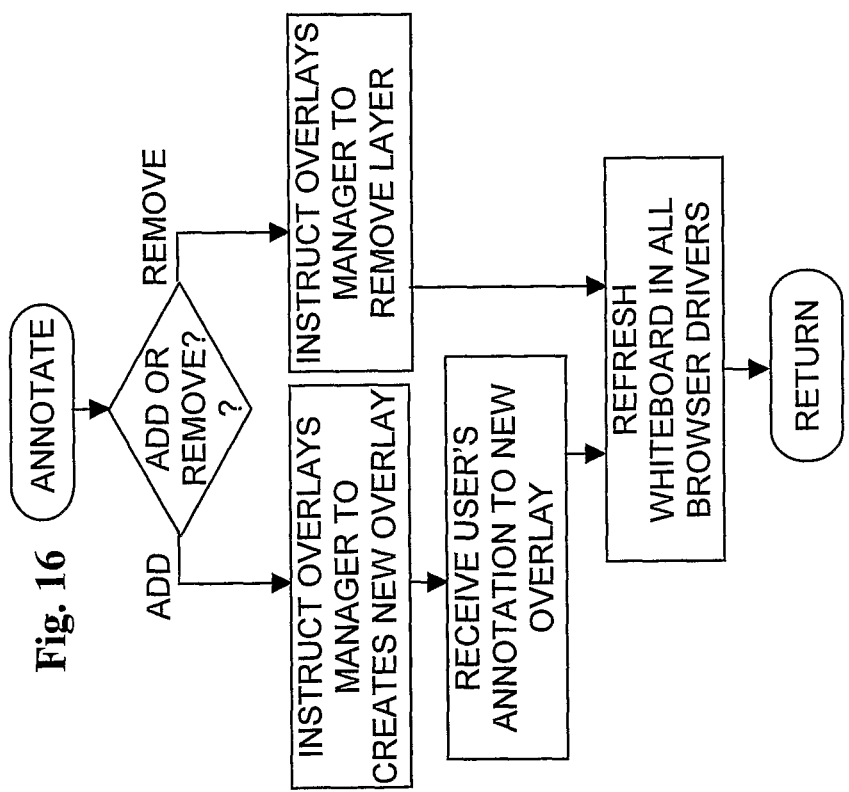
FIG. 16 is a simplified flow chart illustrating the operation of an annotation subroutine useful in the operation of a whiteboard manager module as shown in FIG. 12.

Reference is now made to FIG. 16, which is a simplified flow chart illustrating the operation of an annotation subroutine useful in the operation of a whiteboard manager module as shown in FIG. 12, in accordance with a preferred embodiment of the present invention.

As seen in FIG. 16, the annotation subroutine enables a user having control of the whiteboard to annotate the contents of the whiteboard, preferably within a new overlay, and optionally to discard that new overlay. Thereafter, the annotation subroutine instructs the browser driver tasks to update the browsers of all the participants in that whiteboard.

Figure 17:
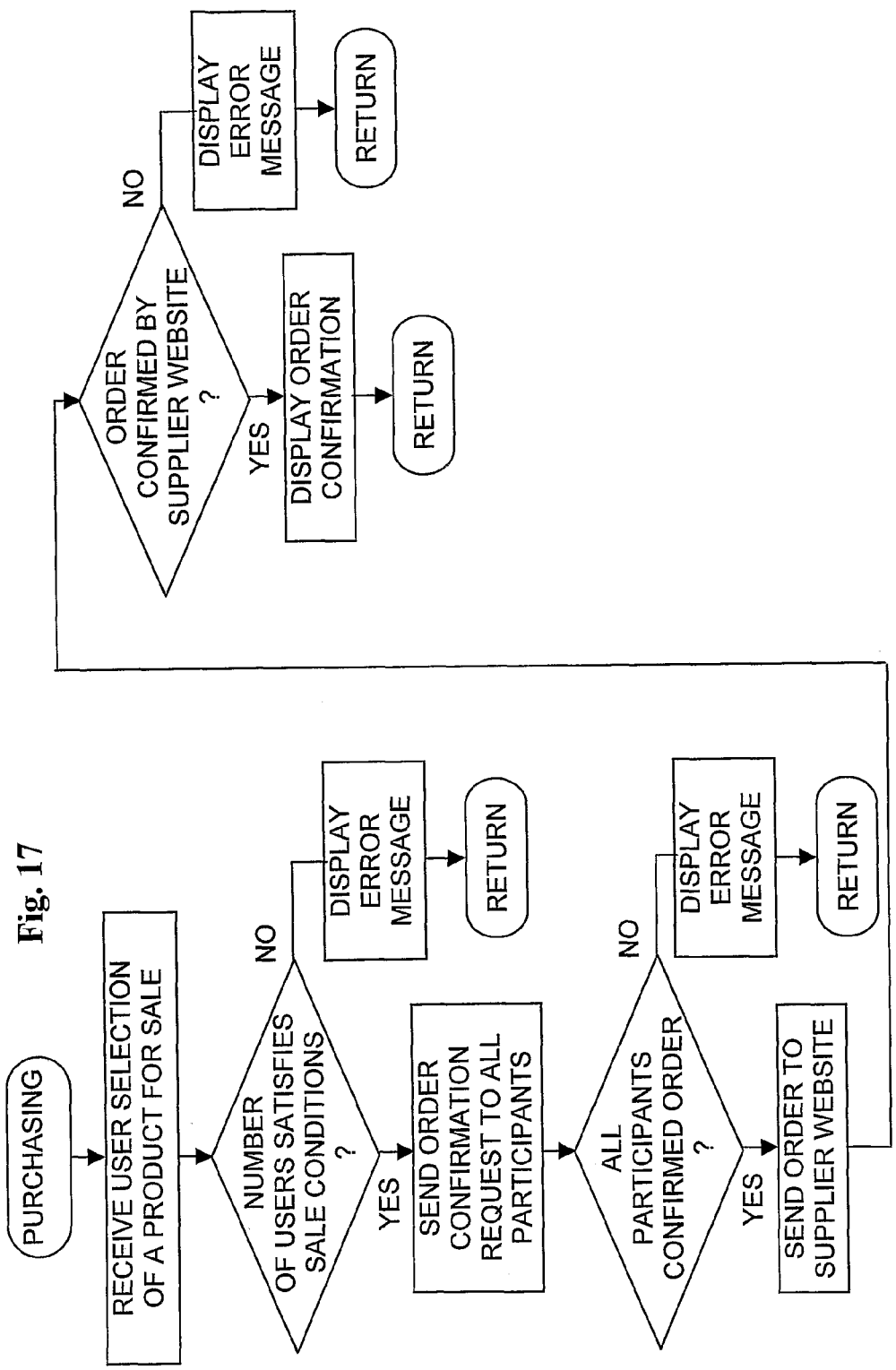
FIG. 17 is a simplified flow chart illustrating the operation of a purchasing subroutine useful in the operation of a whiteboard manager module as shown in FIG. 12.

Reference is now made to FIG. 17, which is a simplified flow chart illustrating the operation of a purchasing subroutine useful in the operation of a whiteboard manager module as shown in FIG. 12, in accordance with a preferred embodiment of the present invention.

The purchasing subroutine enables the participants in a whiteboard to purchase items offered for sale via the whiteboard, for example by means of an advertisement, such as advertisement 110 in whiteboard 102 of FIG. 1. The purchasing subroutine may be initiated by a user, such as by clicking on the item or by clicking on a key assigned for purchase of that item.

As seen in FIG. 17, when a product on sale via the whiteboard is selected for purchase by a whiteboard participant, the purchasing subroutine checks that the number of participants wishing to buy the item is compatible with the offer for sale (e.g. the advertisement). For example, and in accordance with the advertisement 110 of FIG. 1, the product may be offered at a special price for the purchase of 4 units. In this case, the purchasing subroutine checks that at least four of the participants have requested purchase of the product.

If the number of purchasers is compatible with the sale conditions, the purchasing subroutine displays a request to all the participants wishing to purchase to confirm their purchase, by instructing the browser driver tasks to update the browsers of all the participants in that whiteboard. The purchasing subroutine then sends a purchase order to a supplier website and when the order is confirmed the purchasing subroutine displays the confirmation to all users, by instructing the browser driver tasks to update the browsers of all the participants in that whiteboard.

Figure 18:
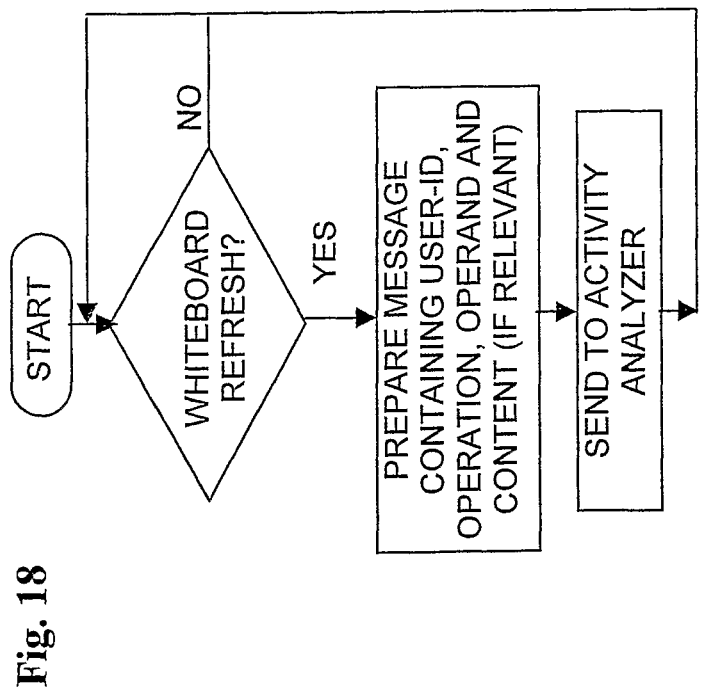
FIG. 18 is a simplified flow chart illustrating the operation of an activity monitor module forming part of the browser-server structure of FIG. 6.

Reference is now made to FIG. 18, which is a simplified flow chart illustrating the operation of an activity monitor module forming part of the browser-server structure of FIG. 6, in accordance with a preferred embodiment of the present invention.

As seen in FIG. 18, the activity monitor module monitors the whiteboard activity preferably by monitoring the information communicated between the whiteboard manager task and the browser manager tasks of a specific group of tasks 422, such as group 504 of FIG. 6, specifically, the instructions sent by the whiteboard manager task to the browser manager tasks to update the client browsers 436 (FIG. 6). When relevant information is detected, the activity monitor module adds to the information, associated data, such as the user ID of the user in control of the whiteboard, toolbox and key identifiers and overlay subject identifier, and sends the information to the activity analyzer task of the whiteboard.

Reference is now made to FIG. 19, which is a simplified flow chart illustrating the operation of an overlays manager module forming part of the browser-server structure of FIG. 6, and to FIGS. 20A, 20B, 20C, 20D and 20E, which are simplified flow charts illustrating various subroutines in the flowchart of FIG. 19, all in accordance with a preferred embodiment of the present invention.

As seen in FIG. 19, the overlays manager module enables a participant to perform several functions related to overlays, such as creating a new overlay, removing an overlay, joining two or more overlays into a single overlay, add overlay annotation and undo overlay annotation.

As seen in FIG. 20A, in response to a create new overlay request, the overlays manager module creates a new overlay including relevant information, such as an overlay ID, a user ID and associated content of the overlay, then updates the overlays database with the new overlay information and then updates the whiteboard manager, which in turn instructs the browser driver tasks to update the browsers of all the participants in the whiteboard.

As seen in FIG. 20B, in response to a remove overlay request, the overlays manager module removes the selected overlay from the overlays database with the new overlay information and then updates the whiteboard manager, which in turn instructs the browser driver tasks to update the browsers of all the participants in the whiteboard.

As seen in FIG. 20C, in response to a join overlay request, the overlays manager module opens the selected overlays to be joined and creates a new overlay including the content of the overlays to be joined, then updates the overlays database with the new overlay information and then updates the whiteboard manager, which in turn instructs the browser driver tasks to update the browsers of all the participants in the whiteboard.

As seen in FIG. 20D, in response to an add annotation request, the overlays manager module opens the selected overlay to be annotated and adds the annotation to the content of the overlay, then updates the overlays database with the annotated overlay information and then updates the whiteboard manager, which in turn instructs the browser driver tasks to update the browsers of all the participants in the whiteboard.

As seen in FIG. 20E, in response to an undo annotation request, the overlays manager module opens the selected overlay to be annotated and removes the selected annotation from the content of the overlay, then updates the overlays database with the overlay information with the annotation removed and then updates the whiteboard manager, which in turn instructs the browser driver tasks to update the browsers of all the participants in the whiteboard.

Figure 21A:
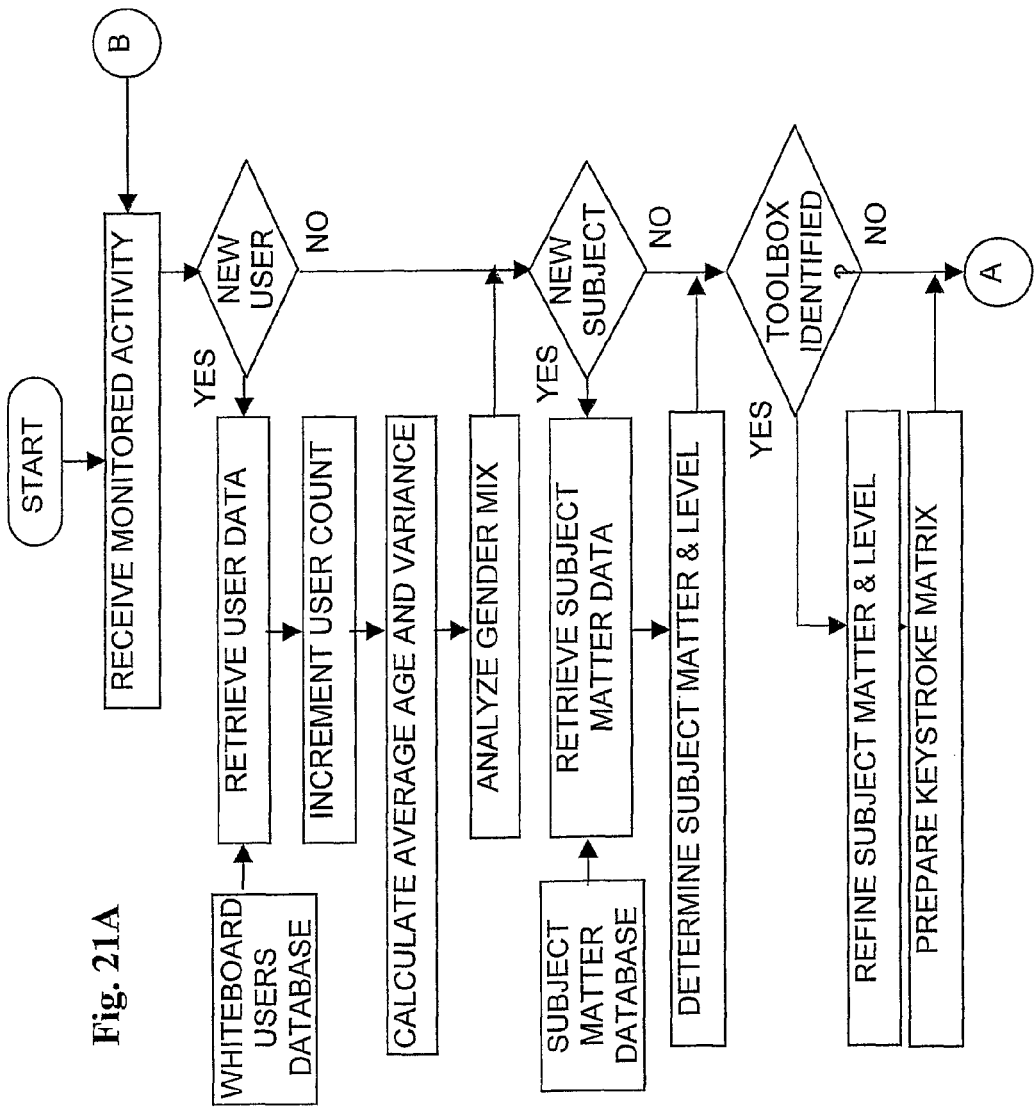
FIGS. 21A and 21B taken together are a simplified flow chart illustrating the operation of an activity analyzer module forming part of the browser-server structure of FIG. 6.
Figure 21B:
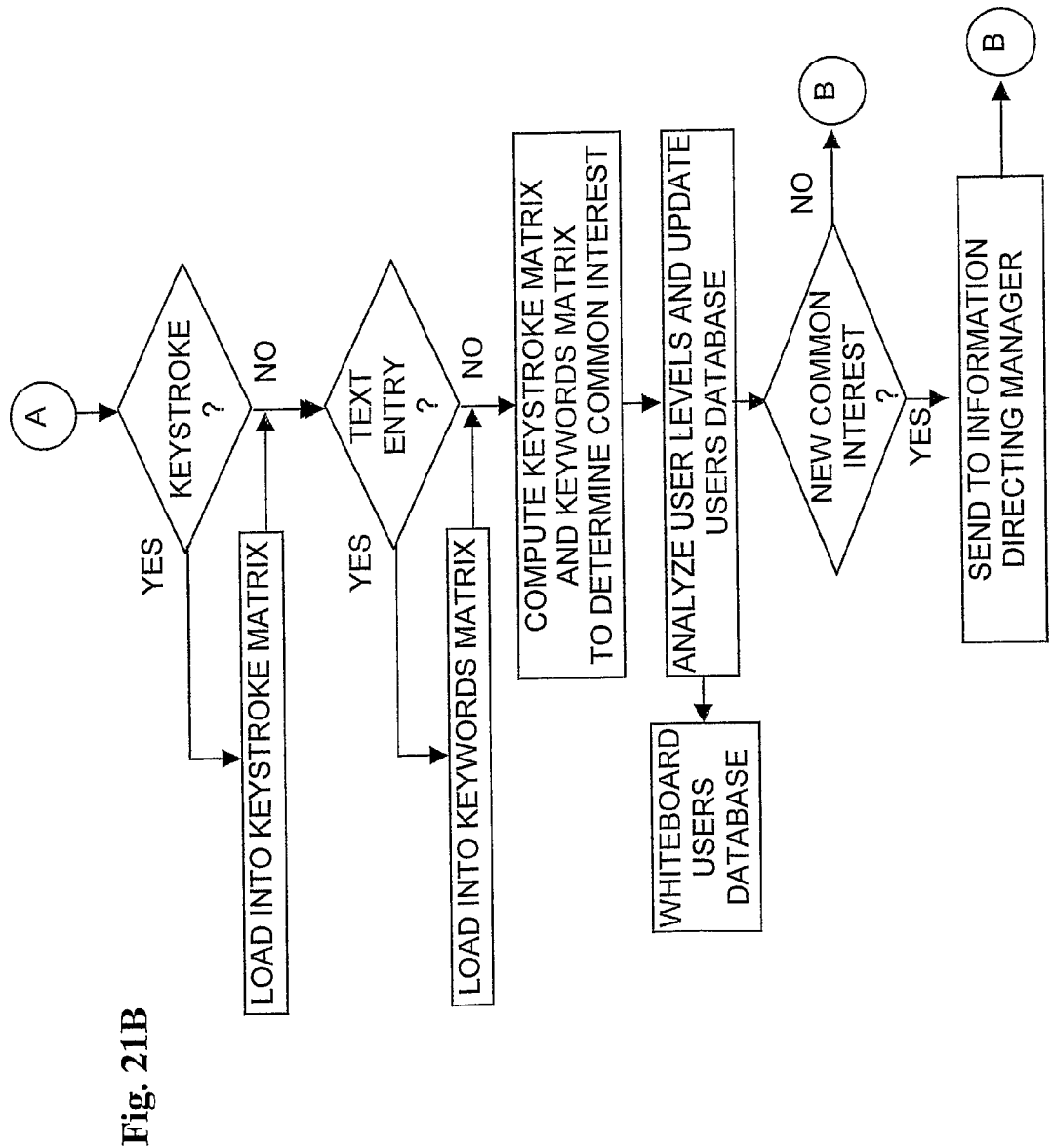

Reference is now made to FIGS. 21A and 21B, which, taken together, are a simplified flow chart illustrating the operation of an activity analyzer module forming part of the browser-server structure of FIG. 6, and to FIG. 22, which is a simplified illustration of a typical matrix employed by the activity analyzer module of FIG. 6 in the operation illustrated in FIGS. 21A and 21B, all in accordance with a preferred embodiment of the present invention.

As described hereinabove, the activity analyzer task of the activity analyzer module is operative to analyze the activity of a whiteboard and to determine common interests among the participants in the whiteboard.

As seen in FIG. 21A, the activity analyzer module preferably is operative to receive information activity messages relating to users from the respective activity monitoring task. Typically, upon receiving an information activity message relating to a user, the activity analyzer module first checks to see if the user is a new user of the whiteboard or is an existing user of the whiteboard. If the user is a new user, the activity analyzer module retrieves the user's record from the users database and re-analyzes the characteristics of the current group of participants, such as count, age, gender, etc.

The activity analyzer module is then operative to check if the received information activity message contains a new subject. If the received information activity message contains a new subject, the activity analyzer module retrieves information pertaining to the subject from the subject matter database and re-analyzes the collection of subjects dealt with in the current whiteboard activity to further determine common interests.

The activity analyzer module is then operative to check if the received information activity message contains an identification of a new toolbox. If the received information activity message contains an identification of a new toolbox, the activity analyzer module is operative to load the relevant toolbox information from the subject matter database, to refine the subject matter identification, such as a skill level, and to create a keystroke matrix for the new toolbox.

As seen in FIG. 21B, the activity analyzer module is then operative to check if the information activity message received contains a keystroke. If the information activity message received contains a keystroke, the activity analyzer module is operative to load the keystroke into the keystroke matrix. The activity analyzer module is then operative to check if the information activity message received contains a text entry. If the information activity message received contains a text entry, the activity analyzer module is operative to load the keystroke into a keyword matrix.

The activity analyzer module is then operative to determine a common interest of the users of the whiteboard by analyzing values in the activity matrices, such as the toolbox matrix, the keystroke matrix and the keyword matrix. The activity analyzer module is then operative to analyze the user level and to update the users database based on the results.

The activity analyzer module is then operative to determine if a new common interest has been identified. If a new common interest has been identified, the new common interest is provided to the whiteboard information directing manager module.

FIG. 22 presents an example of an activity matrix containing columns and rows. The columns are associated with user entries, toolbox selections, such as keystrokes, text entries, and subjects derived from downloaded information. There can be several matrices, one for each of the categories described above, such as keystrokes, text and subjects, or a single combined matrix, such as the matrix of FIG. 22.

The rows are each associated with an information keyword. For each cell in the intersection of a row and a column there is preferably provided an indication of whether the entity associated with the respective column is important for the keyword associated with the respective row.

An additional row contains entity counts representing the number of occurrences of each of the entities associated with the respective columns. An additional column contains cumulative count of occurrences, and a second additional column contains thresholds.

Preferably, each time an entity associated with a column is detected within the information activity message received from the activity monitor the activity analyzer increments the respective entity count. Then, the activity analyzer increments the cumulative count for each row having a marked cell in the respective column.

The activity analyzer then determines a common interest, for example, when a cumulative count passes its respective threshold. Optionally, there can be thresholds for combinations of rows' keywords, preferably described using Boolean statements.

Referring back to FIG. 21B, when the activity analyzer determines a new common interest, the activity analyzer sends the respective keyword or keywords, for which the cumulative count surpassed the respective threshold, to the respective information directing manager task.

Figure 23:
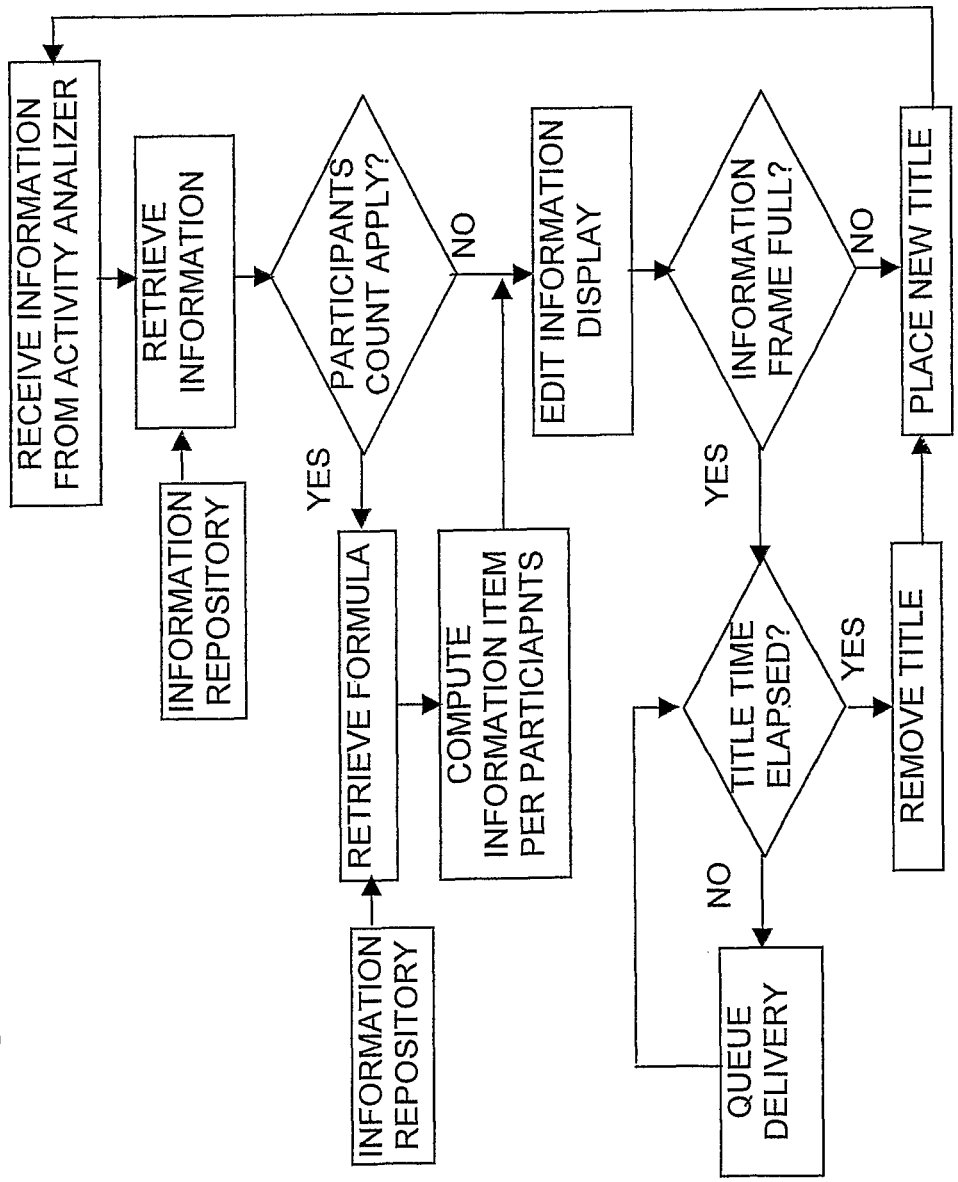
FIG. 23 is a simplified flow chart illustrating the operation of an information directing manager module forming part of the browser-server structure of FIG. 6.

Reference is now made to FIG. 23, which is a simplified flow chart illustrating the operation of an information directing manager module forming part of the browser-server structure of FIG. 6, in accordance with a preferred embodiment of the present invention.

As seen in FIG. 23, the information directing manager task of the information directing manager module preferably receives common interest information from the respective activity analyzer task of the activity analyzer module. The information directing manager module is operative to retrieve from the information repository the information items associated with the keyword or keywords received from the activity analyzer task.

The information directing manager module is then operative to check if the participants are eligible to receive any specific information items, such as information items based on age and/or number of participants. If the participants are eligible to receive specific information items, the information directing manager module then retrieves from the information repository the appropriate information items, such as formulas for computing prices based on the number of participants. The information directing manager module then prepares a presentation of the retrieved information, for example including images, text, and a specific product offering.

The information directing manager module then checks if it is possible to display the information presentation on the whiteboard at the current time. The display of the information presentation may need to be delayed, because, for example, there may be a limit on the number of information presentations that can be posted on the whiteboard concurrently, there may be a limit on the frequency that information presentations can be posted on the whiteboard or there may be a minimum time that an information presentation should be available on the whiteboard. If it is possible to display the information presentation on the whiteboard at the present time, the information presentation is sent to the whiteboard manager, which instructs the respective browser drivers to update their respective browsers. If it is not possible to display the information presentation on the whiteboard at the present time, the information directing manager module is operative to delay the display until a suitable time.

Figure 24:
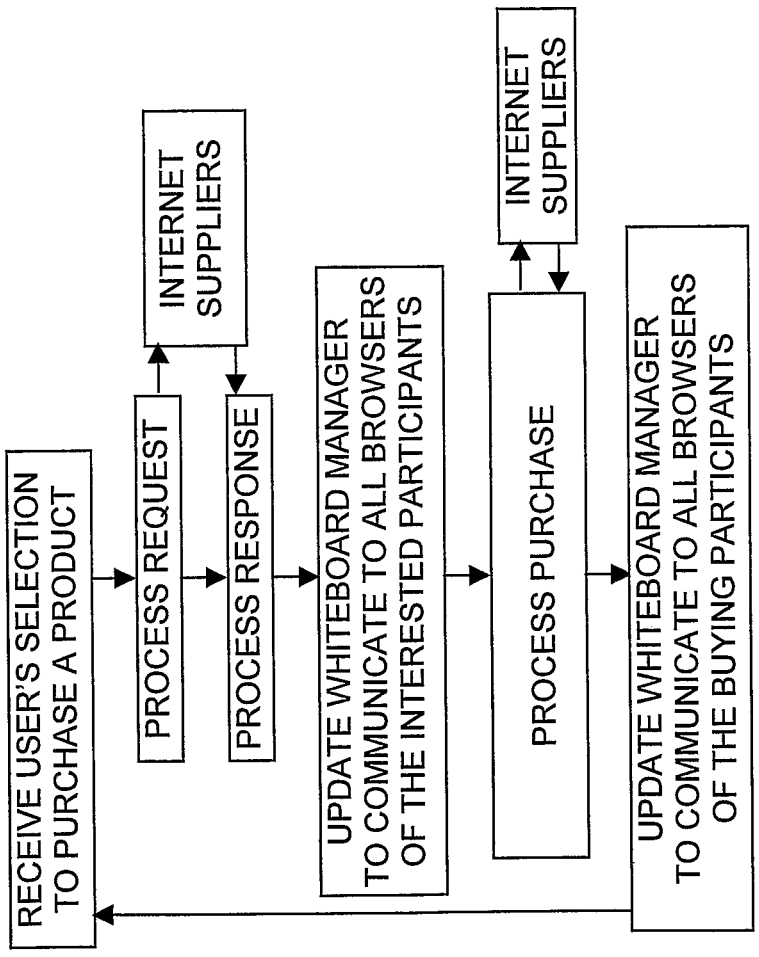
FIG. 24 is a simplified flow chart illustrating the operation of a sourcing manager module forming part of the browser-server structure of FIG. 6.
Figure 25A:
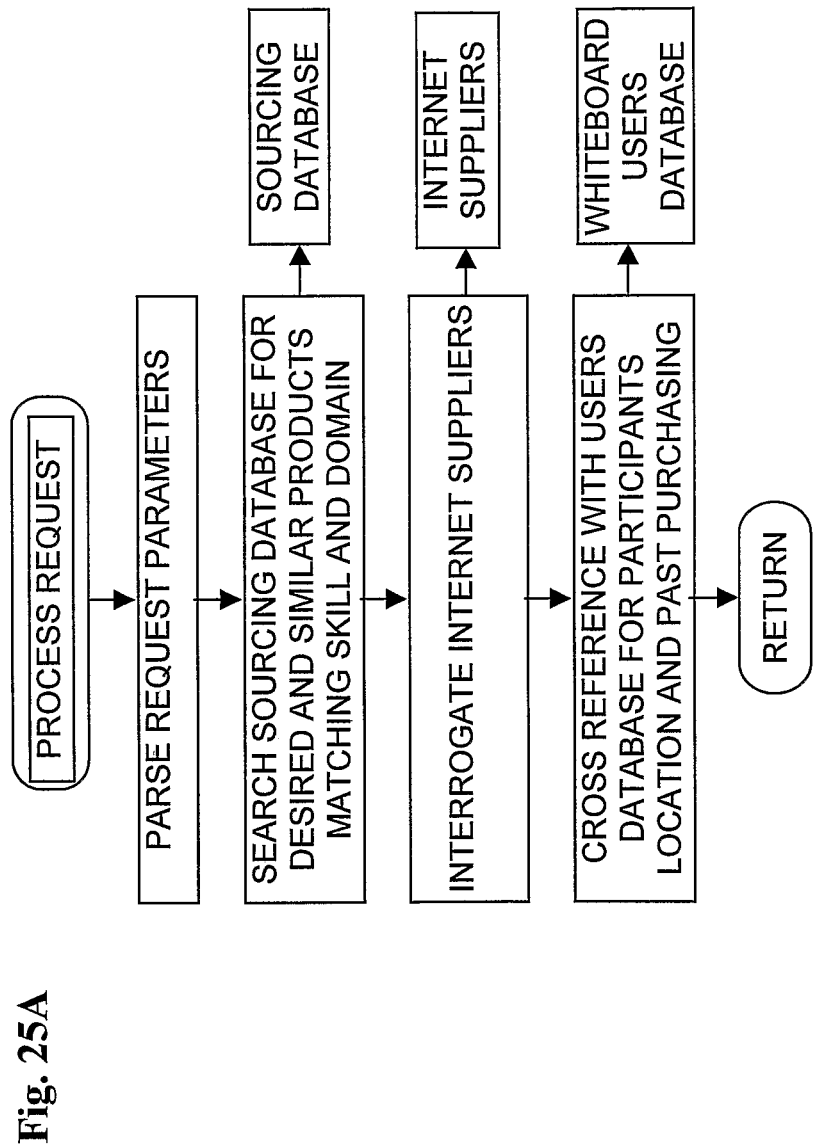
FIGS. 25A, 25B and 25C are a simplified flow charts illustrating various subroutines in the flowchart of FIG. 24.
Figure 25B:
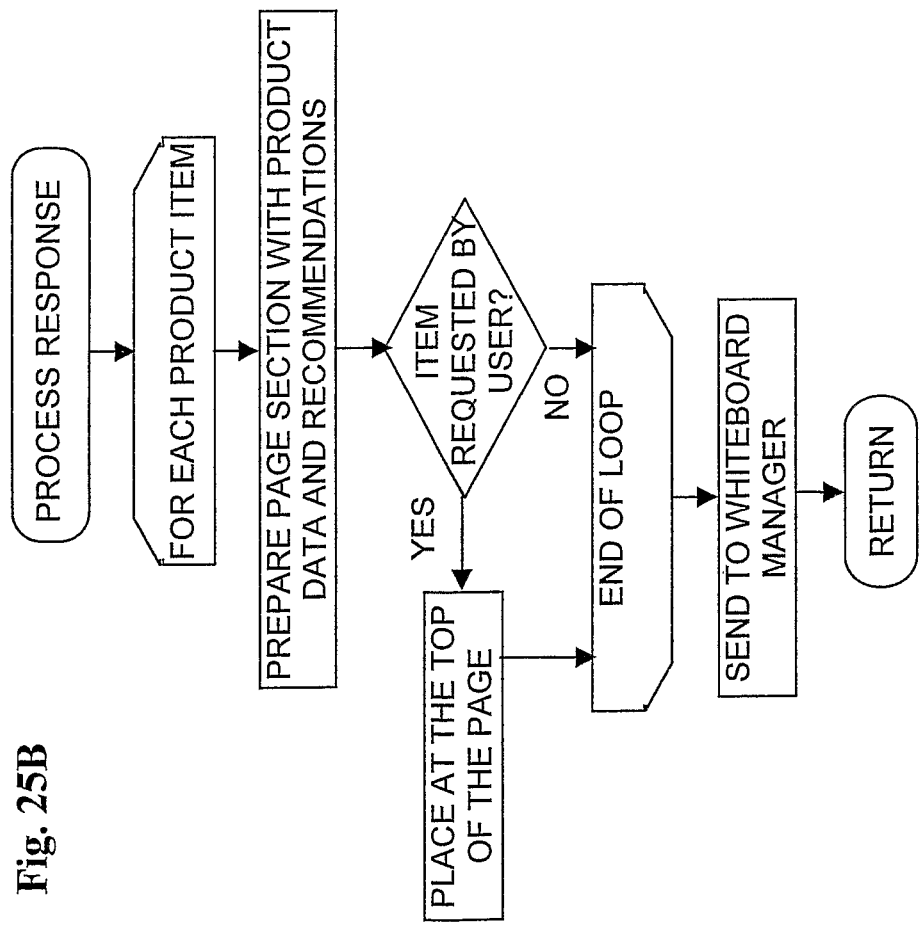
Figure 25C:
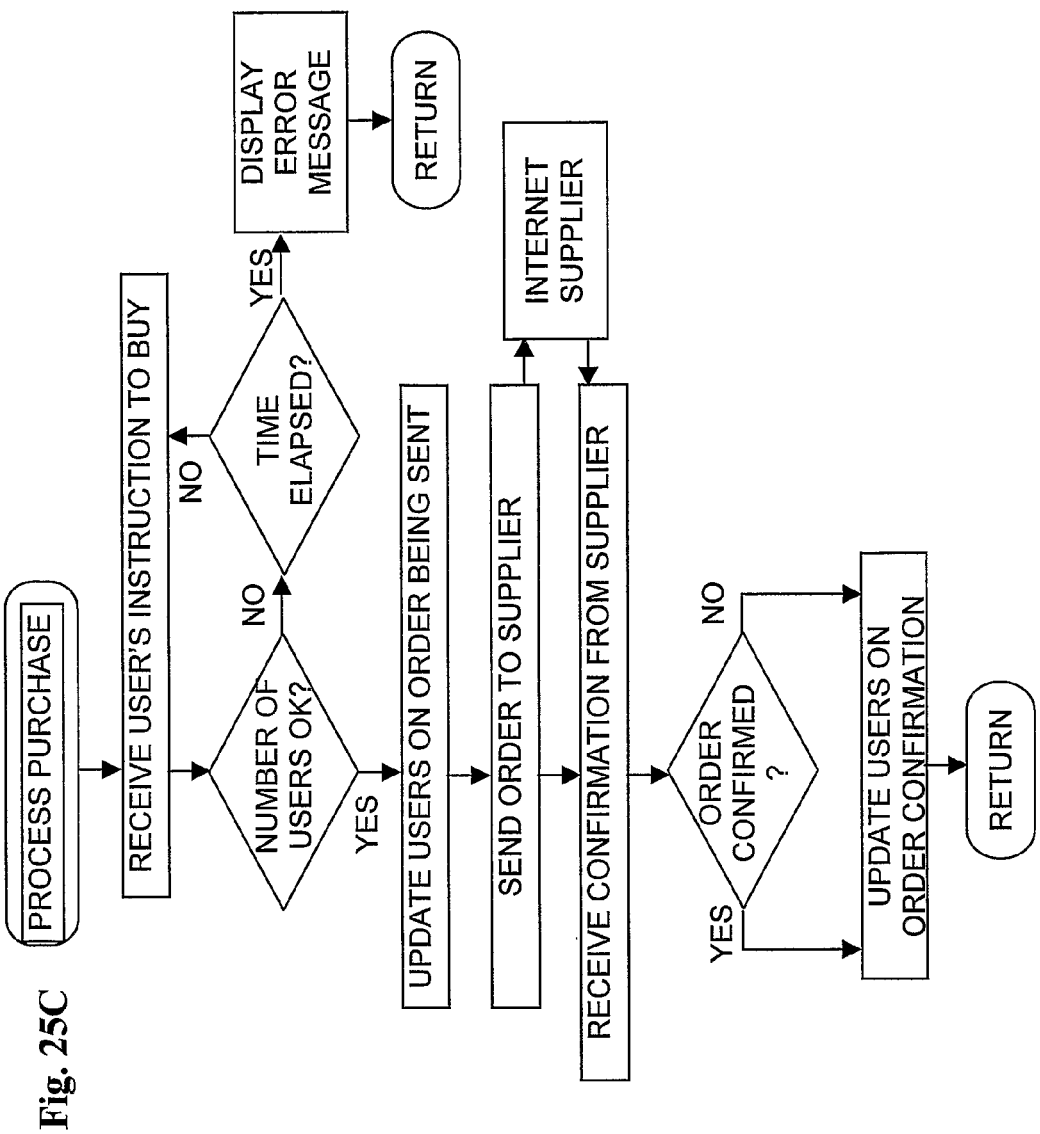

Reference is now made to FIG. 24, which is a simplified flow chart illustrating the operation of a sourcing manager module forming part of the browser-server structure of FIG. 6, and to FIGS. 25A, 25B and 25C, which are simplified flow charts illustrating various subroutines in the flowchart of FIG. 24, in accordance with a preferred embodiment of the present invention.

The sourcing manager module enables the browser-server structure of FIG. 6 to perform online bidding to purchase advertised items. After an item is advertised as described hereinabove, and after a sufficient number of participants are interested in purchasing the item, the sourcing manager module is operative to communicate with an external service, such as a web supplier, to receive a price quotation for the advertised item. If enough participants are willing to buy the item, the sourcing manager module is then operative to process a purchase order.

As seen in FIG. 24, the sourcing manager task of the sourcing manager module for the respective group of users participating in a specific whiteboard activity receives a users' expression of interest to buy an advertised product.

The sourcing manager module is operative to process the request and to send the request to the respective web supplier to receive an updated price quotation, for example a price quotation relating to the number of participants that have indicated interest in buying the advertised item.

The sourcing manager receives a response from the web supplier and then prepares an information display including the purchase information and sends it to the whiteboard manager for distribution, via the browser drivers, to the browsers of the respective user or users, preferably in a separate frame.

The sourcing manager module is then operative to receive from the users instructions to buy, and if the number of users is complies with the offer, to send the purchase instructions to the web supplier. The sourcing manager module is then operative to display the purchase information, typically including a purchase confirmation, to the users that have provided instructions to buy the advertised item.

FIG. 25A is a flow chart of the process request subroutine of FIG. 24. As seen in FIG. 25A, the process request subroutine parses the requests received from the users, then searches the sourcing database for the desired product or similar products matching the skill and the domain presented in the advertising. The parameters parsed by the sourcing database preferably include: product category, such as calculator, product ID, such as manufacturer, subject domain, such as calculus, group skill level, group geographic location and reference organization, such as school.

The sourcing database proceeds to contact web suppliers offering the required products according to the information contained in the sourcing database to receive updated information and price quotations. The sourcing manager module preferably issues a bid for a generic item, such as a simple calculator for elementary mathematics, or a programmable calculator for calculus.

After receiving information from web suppliers, the sourcing manager module cross references the information received with information retrieved from the users database to determine user characteristics, such as past purchasing preferences and user and store locations. For example, the sourcing database may recommend items bought by other members of the same organization, such as a school, or items that can be shipped and delivered promptly from a local supplier.

FIG. 25B is a flow chart of the response preparation subroutine of FIG. 24. As seen in FIG. 25B, the response preparation subroutine collects responses including suitable products and pricing information from web suppliers, adds recommendations, and places the responses and recommendations into a web page display. Preferably, the responses are reordered so that products specified by the interested participants are placed earlier in the display. The display is then sent to the whiteboard manager for distribution.

FIG. 25C is a flow chart of the process purchase subroutine of FIG. 24. As seen in FIG. 25C, the process purchase subroutine is operative to receive users' confirmation to buy from the whiteboard manager. The process purchase subroutine waits until enough users decide to buy the same product, or until a predetermined time elapses. If enough users select to buy an item, the process purchase subroutine informs the users that a purchase order is issued and sends the purchase order to the respective web supplier. When a purchase confirmation is received from the web supplier the process purchase subroutine sends a message to the whiteboard manager to update the participants accordingly.

Reference is now made to FIG. 26, which is a simplified pictorial illustration of a sourcing system and sourcing functionality constructed and operative in accordance with a preferred embodiment of the present invention.

As seen in FIG. 26, there is provided a method and system for directing information to a user including the following elements:

a database containing data about individuals belonging to at least one group of individuals associated with at least one urban structure; and functionality for directing information to at least one of the individuals, the information being automatically selected based on at least one of:

common characteristics of a group of individuals associated with one of the at least one urban structure, to which group the at least one of the individuals belongs; and characteristics of the at least one urban structure with which the at least one of the individuals is associated.

Preferably, there is provided functionality for monitoring financial transactions related to the at least one urban structure in order to ascertain financial status of the individuals. Individuals may also input financial information to the database.

Preferably, the information directed to the individuals is an advertisement or an offer for sale.

In the present example, three individuals, identified by the letters A, B and C are each responsible for maintenance purchases connected with different urban structures. Individual A purchases for an exclusive private house, designated by reference numeral 602, while individual B purchases for a large luxury building, designated by reference numeral 604 and individual C purchases for a middle income apartment building, designated by reference numeral 606.

Individuals A, B and C, each employ their respective computers 612, 614 and 616 to communicate via a network such as the Internet, with a server 618 and preferably manage their maintenance purchases using server 618, which monitors their spending patterns and personalizes and categorizes advertisements and offers for sale in accordance with their spending patterns as ascertained from past activity or from inputs provided by the individuals. Additional inputs to server 618 may be received by tenants or other occupants of the various urban structures.

Accordingly, individual A, who is buying for a single house receives an offer for sale of a single incandescent light bulb at a non-discounted rate of $1.00 per unit, as indicated by reference numeral 622. Individual B, who is buying for a large, luxury apartment house, receives an offer for sale of 200 Halogen lamps at a highly discounted price of $3.00 each, as indicated by reference numeral 624 and individual C, who is buying for an intermediate size, middle income apartment house, receives an offer for sale of 20 fluorescent lamps at an intermediate discount price of $2.00 each, as indicated by reference numeral 626.

It will be appreciated by persons skilled in the art that the present invention is not limited to what is specifically claimed hereinbelow. The scope of the present invention includes combinations and subcombinations of various features described hereinabove as well as modifications and variations thereof which would occur to persons reading the foregoing description and which are not in the prior art.

The invention claimed is:

1. A method for automatically directing information to a plurality of computer users using a plurality of computers to access a computerized interactive multi-user whiteboard which enables contributions of any participant to be received by other participants in effective real time, the method comprising:

enabling said plurality of computer users using said plurality of computers to access said computerized interactive multi-user whiteboard;

automatically monitoring, using at least one server, interactions among said plurality of computer users using said plurality of computers via said computerized interactive multi-user whiteboard;

automatically analyzing, at said at least one server, results of said monitoring to ascertain at least one shared characteristic of said plurality of computer users, said automatically analyzing including identifying at least one common interest of said plurality of computer users by:

identifying a whiteboard toolbox being accessed by said plurality of computer users;

ascertaining a subject and level of said whiteboard toolbox being accessed by said plurality of computer users;

loading at least one of keystrokes and text entries into at least one matrix which contains at least keystrokes and keywords; and employing said at least one matrix to ascertain said at least one common interest; and employing the results of said analyzing to selectively direct non-user originated information from said at least one server to said plurality of computer users using said plurality of computers while said plurality of computer users is accessing said computerized interactive multi-user whiteboard using said plurality of computers.

2. A method for automatically directing information to a plurality of computer users according to claim 1 and wherein said automatically analyzing comprises ascertaining, at said at least one server, at least one of;

a number of computer users currently using said computerized interactive multi-user whiteboard; and a skill level of at least one of said plurality of computer users currently using said computerized interactive multi-user whiteboard.

3. A method for automatically directing information to a plurality of computer users according to claim 1 and wherein said non-user originated information comprises at least one of:

selectable information automatically selected in accordance with said at least one shared characteristic of said plurality of computer users;

an advertisement automatically selected in accordance with said at least one shared characteristic of said plurality of computer users; and an offer to sell automatically selected in accordance with said at least one shared characteristic of said plurality of computer users.

4. A method for automatically directing information to a plurality of computer users according to claim 3 and also comprising carrying out a sale transaction with said plurality of computer users based on said non-user originated information.

5. A method for automatically directing information to a plurality of computer users according to claim 1 and also comprising:

enabling said plurality of computer users, using said at least one server, to incorporate an external web resource into said computerized interactive multi-user whiteboard using said plurality of computers, such that said external web resource is accessible to said plurality of computer users via said-computerized interactive multi-user whiteboard.

6. A method for automatically directing information to a plurality of computer users according to claim 5 and wherein at least one of said computerized interactive multi-user whiteboard and said external web resource comprises at least one of:

a search functionality;

and a web page.

7. A method for automatically directing information to a plurality of computer users according to claim 5 and also comprising at least one of automatically adapting, using said at least one server, said operation of said external web resource to said at least one shared characteristic of said plurality of computer users;

retrieving information, using said at least one server, from said external web resource, which information is automatically adapted to said at least one shared characteristic of said plurality of computer users;

searching for information;

carrying out a sale transaction, using said at least one server, with said plurality of computer users using said computers based on said non-user originated information; and enabling, using said at least one server, said plurality of computer users to perform, within a framework of said computerized interactive multi-user whiteboard, at least one of:

annotating information received from said external web resource; and operating said external web resource.

8. A method for automatically directing information to a plurality of computer users according to claim 5 wherein said at least one server also includes at least one of the following:
 a browser manager module;
 a whiteboard manager module;
 a whiteboard overlays manager module;
 a whiteboard activity monitoring module;
 a whiteboard activity analyzer module;
 a whiteboard information directing manager module;
 a sourcing manager module;
 a subject matter database;
 a whiteboard database;
 an information repository;
 an overlays database;
 a users database; and
 a sourcing database.

9. A method for automatically directing information to a plurality of computer users according to claim 5 wherein said at least one server is also operative to perform at least one of the following:
 browser driver tasks;
 a whiteboard manager task;
 a whiteboard overlays manager task;
 a whiteboard activity monitoring task;
 a whiteboard activity analyzer task;
 a whiteboard information directing manager task; and
 a sourcing manager task.

10. A method for automatically directing information to a plurality of computer users according to claim 5 and also comprising providing communication, via said at least one server, between at least one of:
 a subject matter database and a whiteboard activity analyzer module;
 a whiteboard database and a whiteboard manager module;
 a whiteboard database and a browser manager module;
 an information repository and a whiteboard information directing manager module;
 an overlays database and a whiteboard overlays manager module;
 a users database and a whiteboard activity monitoring module;
 a users database and a whiteboard activity analyzer module;
 a users database and a whiteboard manager module;
 a sourcing database and a sourcing manager module;
 a whiteboard manager and a browser driver tasks;
 a whiteboard overlays manager task and a whiteboard manager task;
 a whiteboard activity monitoring task and a whiteboard manager task;
 a whiteboard activity analyzer task and a whiteboard activity monitoring task;
 a whiteboard information directing manager task, a whiteboard activity analyzer task and a whiteboard manager task;
 a sourcing manager task and browser driver tasks;
 a sourcing manager task and a sourcing database; and
 a sourcing manager task and external databases operated by external services offering products for sale.

11. A method for automatically directing information to a plurality of computer users according to claim 5 and also comprising:
 storing, at said at least one server, personalizing information regarding each of said plurality of computer users; and
 providing, using said at least one server, said personalizing information to a whiteboard activity analyzer task.

12. A method for automatically directing information to a plurality of computer users according to claim 5 and also comprising
 storing, at said at least one server, information relating to external topics; and
 supplying said information relating to external topics from said at least one server to a whiteboard activity analyzer task.

13. A method for automatically directing information to a plurality of computer users according to claim 5 also comprising:
 storing, at said at least one server, information to be pushed to said plurality of computer users, and
 supplying said information to be pushed to said plurality of computer users from said at least one server to a whiteboard information directing manager task.

14. A method for automatically directing information to a plurality of computer users according claim 5 and wherein said at least one server is configured according to at least one of the following configurations:
 a subject matter database and an information repository are located within said at least one server; and
 subject matter database and an information repository are remotely located from said at least one server and are shared and accessible via the Internet.

15. A method for automatically directing information to a plurality of computer users according to claim 5 and also comprising providing a subject matter database including at least one of a search engine and an information directory.

16. A method for automatically directing information to a plurality of computer users according to claim 5 and also comprising providing an information repository including a web advertising management engine.

17. A method for automatically directing information to a plurality of computer users according to claim 5 and also comprising providing a browser manager module including a user access subroutine including user login functionality and user registration functionality.

18. A method for automatically directing information to a plurality of computer users according to claim 5 and also comprising providing a sourcing manager module operative to perform at least one of:
 automatic online bidding; and
 facilitating a purchase.

19. A method for automatically directing information to a plurality of computer users according to claim 5 and also comprising at least one of:
 sensing, at said at least one server, a level of said plurality of users employing said computerized interactive multi-user whiteboard; and
 sensing, at said at least one server, a level of said plurality of users employing said computerized interactive multi-user whiteboard by analyzing stored profiles of said plurality of said users.

20. A method for automatically directing information to a plurality of computer users according to claim 1 and wherein:
said at least one matrix includes:
a plurality of columns associated with said at least one of keystrokes and text entries; and
a plurality of rows associated with information keywords; and
intersections of said plurality of columns and said plurality of rows define cells indicating whether an entity associated with a respective column is important for a keyword associated with a respective row.

21. A method for automatically directing information to a plurality of computer users according to claim 20 and wherein said at least one matrix also includes at least one of:
an additional row representing a number of occurrences of each of said at least one of keystrokes and text entries;
at least a first additional column including a cumulative count of occurrences; and
at least a second additional column including thresholds.

22. A method for automatically directing information to a plurality of computer users according to claim 21 and wherein aid identifying at least one common interest comprises comparing said cumulative count with a respective one of said thresholds.

23. A method for automatically directing information to a plurality of computer users according to claim 21 and wherein said identifying at least one common interest comprises comparing a combination of said cumulative count with a respective combination threshold.

24. A system for automatically directing information to a plurality of computer users using a plurality of computers to access a computerized interactive multi-user whiteboard which enables contributions of any participant to be received by other participants in effective real time, the system comprising at least one computer server including:
a computerized interactive multi-user whiteboard which enables contributions of any participant to be received by other participants in effective real time accessible to said a-plurality of computer users using said plurality of computers;
an interactions monitor operative to automatically monitor interactions among said plurality of computer users using said plurality of computers via said computerized interactive multi-user whiteboard;
an analyzer operative to automatically analyze said interactions and to ascertain at least one shared characteristic of said plurality of computer users, said analyzer identifying at least one common interest of said plurality of computer users by:
identifying a whiteboard toolbox being accessed by said plurality of computer users;
ascertaining a subject and level of said whiteboard toolbox being accessed by said plurality of computer users;
loading at least one of keystrokes and text entries into at least one matrix which contains at least keystrokes and keywords; and
employing said at least one matrix to ascertain said at least one common interest; and
an information director operative to selectively direct non-user originated information from said at least one computer server to said plurality of computer users using said plurality of computers while said plurality of computer users is accessing said computerized interactive multi-user whiteboard using said plurality of computers based on said at least one shared characteristic.

25. A system for automatically directing information to a plurality of computer users according to claim 24 and wherein said at least one server also comprises:
a resource incorporator operative to enable said plurality of computer users to incorporate an external web resource into said computerized interactive multi-user whiteboard, such that said external web resource is accessible to said plurality of computer users via said computerized interactive multi-user whiteboard.

26. A non-transitory machine readable medium having stored thereon a computer program for automatically directing information to a plurality of computer users using a plurality of computers to access a computerized interactive multi-user whiteboard which enables contributions of any participant to be received by other participants in effective real time using said plurality of computers, the computer program comprising:
a computer readable program code for enabling said a-plurality of computer users using said plurality of computers to access-said computerized interactive multi-user whiteboard which enables contributions of any participant to be received by other participants in effective real time using said plurality of computers;
computer readable program code for automatically monitoring, using at least one server, interactions among said plurality of computer users using said plurality of computers via said computerized interactive multi-user whiteboard;
computer readable program code for automatically analyzing, at said at least one server, results of said monitoring to ascertain at least one shared characteristic of said plurality of computer users, said automatically analyzing including identifying at least one common interest of said plurality of computer users by:
identifying a whiteboard toolbox being accessed by said plurality of computer users;
ascertaining a subject and level of said whiteboard toolbox being accessed by said plurality of computer users;
loading at least one of keystrokes and text entries into at least one matrix which contains at least keystrokes and keywords; and
employing said at least one matrix to ascertain said at least one common interest; and
computer readable program code for employing results of said analyzing to selectively direct non-user originated information from said at least one server to said plurality of computer users using said plurality of computers while said plurality of computer users is accessing said computerized interactive multi-user whiteboard using said plurality of computers.

27. A computer program for automatically directing information to a plurality of computer users according to claim 26 wherein said tangible medium also comprises:
computer readable program code for enabling said plurality of computer users, using at least one server, to incorporate an external web resource into said computerized interactive multi-user whiteboard, such that said external web resource is accessible to said plurality of users via said shared web resource computerized interactive multi-user whiteboard.

* * * * *